United States Patent
Pathmasuntharam et al.

(10) Patent No.: US 8,618,982 B2
(45) Date of Patent: Dec. 31, 2013

(54) COMMUNICATION DEVICE AND METHOD FOR CONTROLLING AN ANTENNA ARRANGEMENT

(75) Inventors: Jaya Shankar Pathmasuntharam, Singapore (SG); Syed Naveen Altaf Ahmed, Singapore (SG); Wee Tiong Tan, Singapore (SG); Meng How Lim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 57 days.

(21) Appl. No.: 13/059,793

(22) PCT Filed: Jun. 22, 2009

(86) PCT No.: PCT/SG2009/000226
§ 371 (c)(1),
(2), (4) Date: May 9, 2011

(87) PCT Pub. No.: WO2010/021595
PCT Pub. Date: Feb. 25, 2010

(65) Prior Publication Data
US 2011/0210891 A1    Sep. 1, 2011

Related U.S. Application Data

(60) Provisional application No. 61/091,201, filed on Aug. 22, 2008.

(51) Int. Cl.
*H01Q 3/00* (2006.01)
(52) U.S. Cl.
USPC .......................................................... 342/359
(58) Field of Classification Search
USPC .......................................................... 342/359
See application file for complete search history.

(56) References Cited

U.S. PATENT DOCUMENTS

| | | |
|---|---|---|
| 5,854,609 A | 12/1998 | Pyo et al. |
| 7,236,537 B2 | 6/2007 | Hottinen et al. |
| 2002/0167449 A1* | 11/2002 | Frazita et al. ................. 343/756 |
| 2004/0248518 A1 | 12/2004 | Kashiwase |
| 2007/0272142 A1* | 11/2007 | Nedwed ......................... 114/122 |

FOREIGN PATENT DOCUMENTS

EP    1662676 A1    5/2006

* cited by examiner

*Primary Examiner* — Harry Liu
(74) *Attorney, Agent, or Firm* — K. David Crockett, Esq.; Niky Economy Syrengelas, Esq.; Crockett & Crockett, PC

(57) ABSTRACT

A communication device is described comprising an antenna arrangement, an orientation determining device configured to determine the orientation of the antenna arrangement, and a controller configured to control the directivity of the antenna arrangement based on the determined orientation of the antenna arrangement.

22 Claims, 22 Drawing Sheets

COMMUNICATION DEVICE AND METHOD FOR CONTROLLING AN ANTENNA ARRANGEMENT

Embodiments generally relate to a communication device and a method for controlling an antenna arrangement.

Deploying wireless communication systems in marine environment has its own challenges. The wireless channel responses are different from that of land because of ships' movements, ships' properties, reflective properties of the sea water and the way ships are situated in a marine environment. Therefore, methods to realize a cost effective mesh node solution and also to overcome issues which degrade wireless connectivity in marine environment are desirable.

An object according to one embodiment may be seen in providing a communication device that allows more robust radio communication for example in a marine environment.

In one embodiment, a communication device is provided including an antenna arrangement, an orientation determining device configured to determine the orientation of the antenna arrangement, and a controller configured to control the directivity of the antenna arrangement based on the determined orientation of the antenna arrangement.

In another embodiment, a method for controlling an antenna arrangement of a communication device is provided, including determining the orientation of the antenna arrangement; and controlling the directivity of the antenna arrangement based on the determined orientation of the antenna arrangement.

Illustrative embodiments are explained below with reference to the drawings. In the drawings, like reference characters generally refer to the same parts throughout the different views. The drawings are not necessarily to scale, emphasis instead generally being placed upon illustrating the principles of the invention.

In the following, observations, which may be seen as a basis of some embodiments, made in course of a field test conducted in a sea port environment are described. These observations are based on several propagation measurements carried out in the Singapore Straits. In the setup, 10 dBm continuous wave (CW) signals transmitted at 2.43 GHz from a signal generator have been used. The output signal from the signal generator was further amplified to 27 dBm with an amplifier. This signal was transmitted using a vertically linearly polarized antenna. The antenna had an Omni-directional radiation pattern. The gain of the antenna was about 2 dB. The same antenna was used at the receiver. The receiver was placed on a diving boat and was mounted 7.2 m from the sea surface. The antenna was connected to a 20 dB Low Noise Amplifier (LNA) and then to a spectrum analyzer. A laptop was connected to the spectrum analyzer to acquire peak power reading from spectrum analyzer every second. The collected peak power data was time-stamped. A Global Positioning System (GPS) receiver placed on the boat provided the distance from the transmitter. Distance and received signal strength were recorded and a path loss analysis was carried out by using linear regression. In one setup, the transmitter was placed on top of Bedok Light House (BLH), Singapore, which is 76 m tall. The light house is about a half kilometer away from the shore.

The received power may be written as a function of the Tx-Rx (transmitter-receiver) separation distance d as follows:

$$P_R(d) = \langle P_R(d_0) \rangle - 10n \log(d/d_0) - X\sigma \qquad (1)$$

where $\langle P_R(d_0) \rangle$ is the average path loss at a reference distance $d_0$, n is the path loss exponent, and $X\sigma$ is a zero mean log-normally distributed random variable with standard deviation $\sigma$. The parameters n and $\sigma$ can be determined using linear regression of the path loss values against the log of normalized distance $(d/d_0)$ in a minimum mean square error (MMSE) manner.

In the measurements carried out, $d_0$ has been 10 m and $\langle P_R(d_0) \rangle$ has been −10.5 dBm. In this measurement involving Bedok Light House, the LOS (line of sight) condition was dominant as illustrated in FIG. 1.

Figure 1:
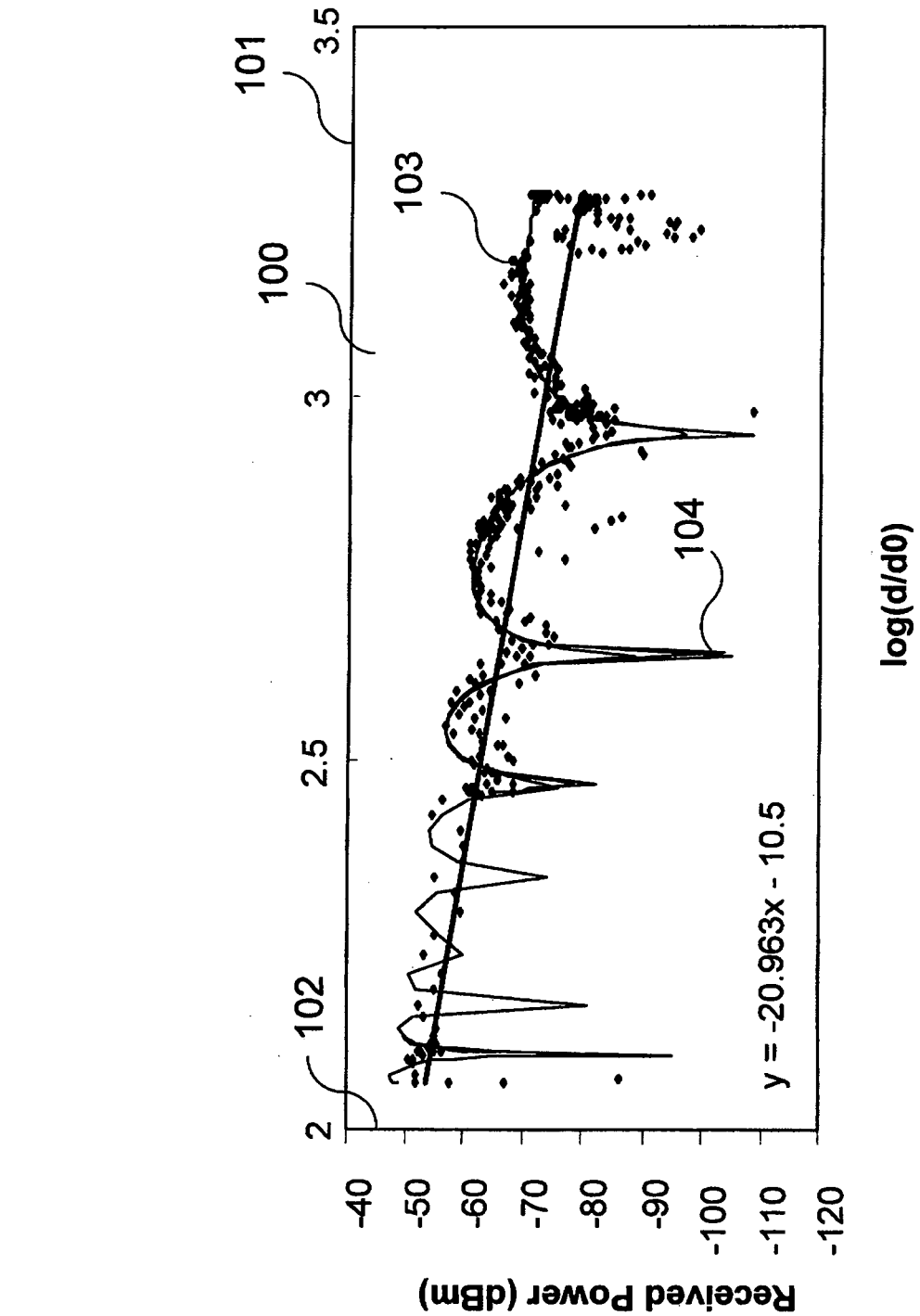
FIG. 1 shows a graph illustrating results of a radio transmission measurement.

FIG. 1 shows a graph 100 illustrating results of a radio transmission measurement.

Along a first axis (x-axis) 101, the logarithm of the normalized distance between transmitter and receiver is illustrated.

Along a second axis (y-axis) 102, the received power (in dBm) is illustrated.

The dots 103 shown in the graph 100 represent measured mean received power while the boat (holding the receiver) was making way. The normalized distance $\log(d/d_0)$ has included the light house height. The curve 104 that has peaks and nulls is the calculated received power using a two-ray model at a normalized distance of the collected data. The first ray/path of the two-ray model is the LOS signal from the transmitter to the receiver. The second ray/path of the two-ray model is a signal reflected from the sea surface received at the receiver on the boat.

The sea surface at 2.43 GHz typically still satisfies good conductor condition. Good conductor condition may be seen to be satisfied when $f<\sigma/\epsilon_0\epsilon_R$ (or $\sigma/\omega\epsilon>>1$), where $\sigma$ is conductivity, f is the signal frequency and $\epsilon_0$ and $\epsilon_R$ are permittivity and relative permittivity, respectively. For sea water, typical values are $\sigma=5$ S/m and $\epsilon_R=81$. As long as the frequency of the signal is below 7 GHz, sea water can be assumed as a conductor.

As can be seen from FIG. 1, the two-ray model used fits quite closely with the measured data. This shows that the model is well suited to represent the propagation model for a sea port environment. Asymptotic behavior of the two-ray model occurs at a distance $d>d_A=20\ h_T h_R/\lambda$ where $h_T$ is the transmitter antenna height, $h_R$ is the receiver antenna height and of the $\lambda$ is the wavelength of the transmitted signal.

The corresponding normalized distance is 3.94 which is beyond the distance coverage during this measurement. Single linear regression may be considered as sufficient to curve fit the data to find the exponent path loss n and the standard deviation. The exponent path loss has been found to be 2.09 and the standard deviation has been found to be 6.43.

From FIG. 1, it can be seen that the reflected wave causes destructive interference at a certain distance causing up to −20 dB drop in the received signal. In one embodiment, the mitigation of this problem is achieved.

Furthermore, measurements for observing the Doppler shift spectrum have been carried out. The geographical arrangement of the various components used for this measurement is shown in FIG. 2.

Figure 2:
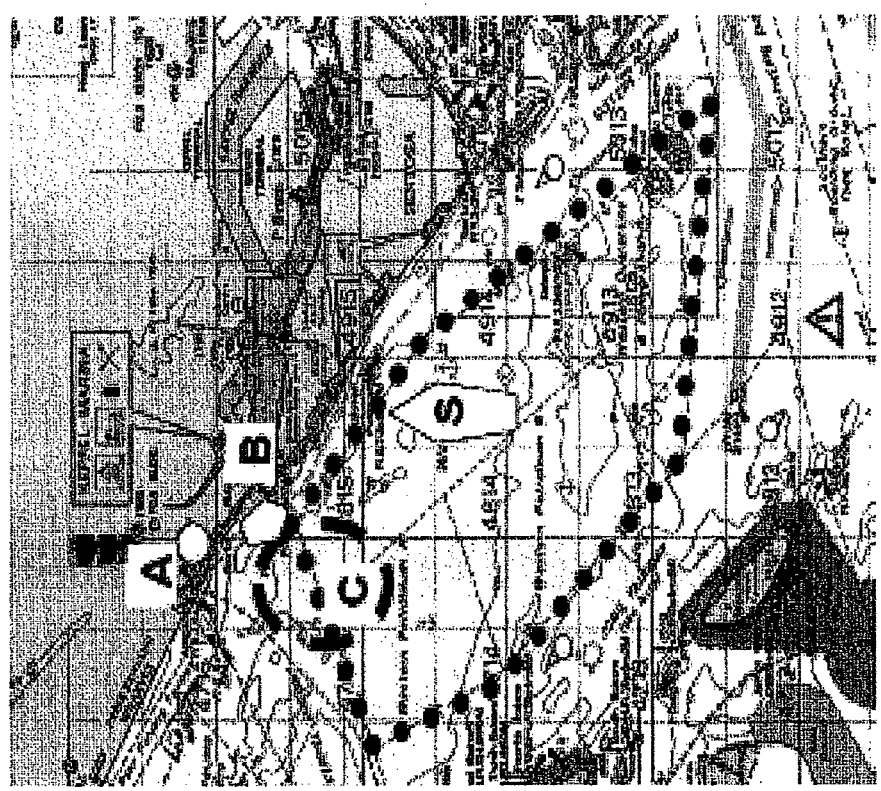
FIG. 2 shows a map section.

FIG. 2 shows a map section 200.

A transmitter was placed at a position A (on land) and a spectrum analyzer was placed on a boat at position B. The transmitter consisted of a signal generator generating a CW signal of 5.8 GHz frequency and 0 dBm power. It was connected to a power amplifier with 30 dB gain. The output of the amplifier was connected to a sector antenna pointing towards the boat. A spectrum analyzer on the boat was connected to a receive antenna (both an Omni-directional receive antenna and a sectorized receive antenna have been used) to observe the received spectrum. The CW spectrum received was saved in the spectrum analyzer. When the sector antenna was used, the antenna was always pointed toward the transmitter at position A.

Figure 3A:
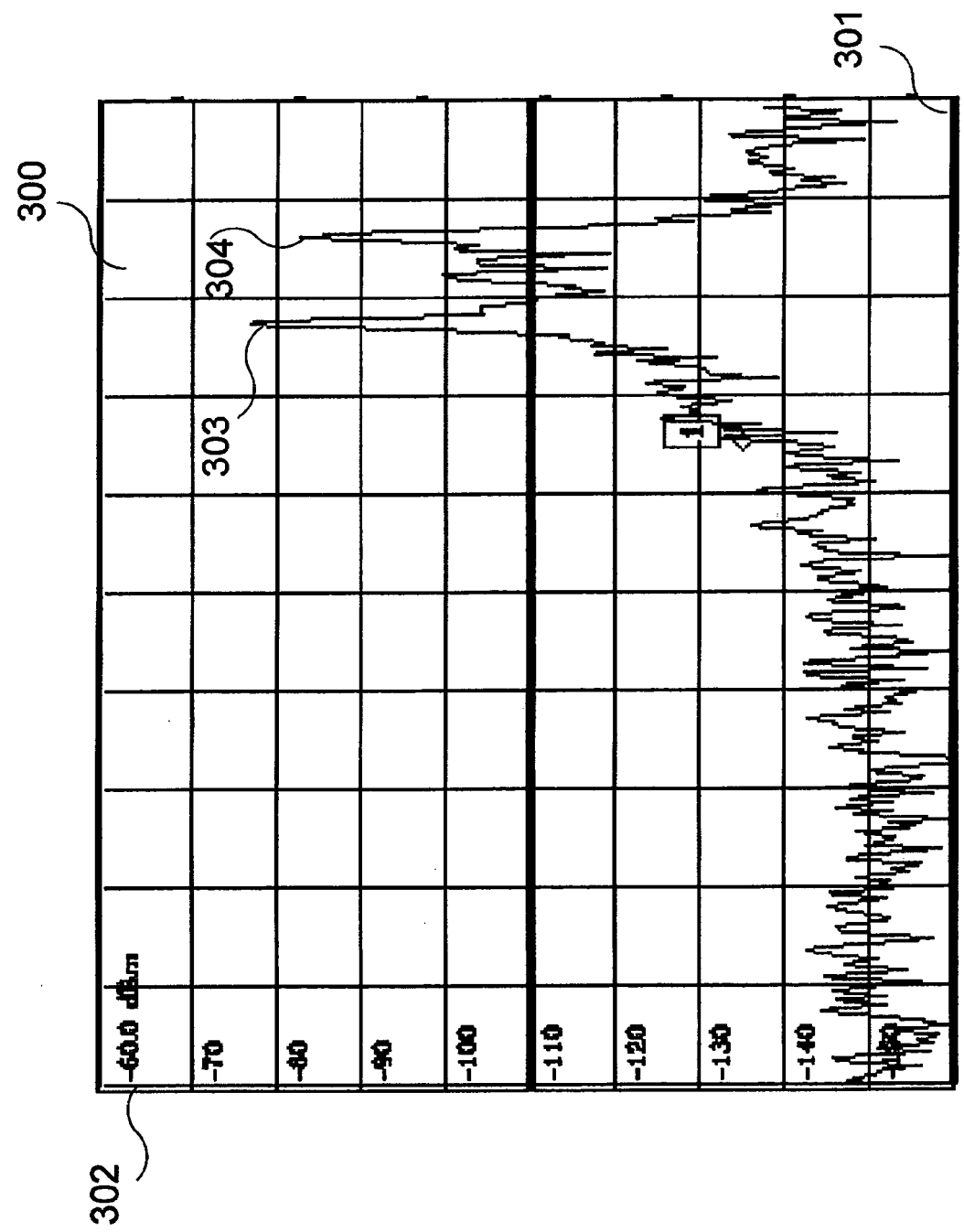
FIGS. 3A and 3B show graphs illustrating results of radio transmission measurements.

FIG. 3A shows a graph 300 illustrating results of a radio transmission measurement.

Along a first axis (x-axis) 301, the frequency of the received signal is illustrated.

Along a second axis (y-axis) 302, the received power (in dBm) is illustrated.

The center frequency is 5.8 GHz, the horizontal scale is 300 Hz/div and the vertical scale is 10 dB/div.

The graph 300 illustrates a snapshot of the received CW spectrum when the boat is moving away from position A towards a position on the sea S (cf. the map section 200). An Omni-directional antenna was used. The boat was moving at the speed of 5 m/sec. There are two dominant peak signal received with amplitudes close to each other. The lower frequency peak 303 was received as a Doppler shifted signal from position A due to the boat's motion away from transmitter at position A. The higher frequency peak 304 was received as a Doppler shifted signal from position S. Position S can be seen as a virtual transmitter to the boat because it reflected the signal from transmitter at position A. Since the boat was moving toward position S, the received signal is Doppler shifted to a frequency higher than that of the transmitter. According to the Doppler shift calculation, the difference in these two frequencies is $2*v/c*fc$ where v is boat's speed, c is the speed of light and fc is the transmitter frequency. The difference amounts to 193 Hz in this example.

Moving along a similar path using a sector antenna, the received spectrum no longer consisted of two peaks. Since the sector antenna was always pointed toward the transmitter, one would expect that the amplitude of higher frequency peak will be significantly reduced as shown in FIG. 3B.

Figure 3B:
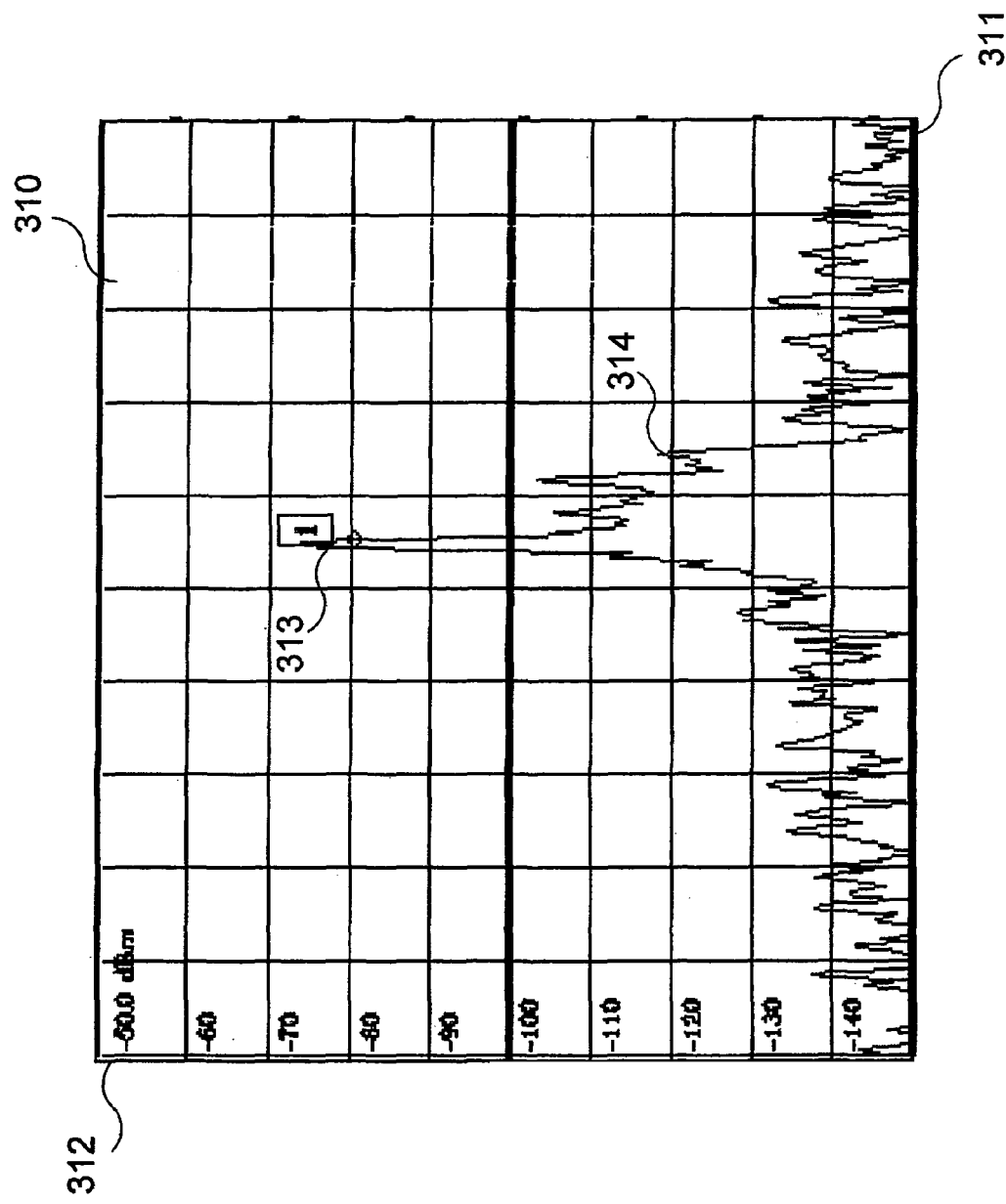

FIG. 3B shows a graph 310 illustrating results of a radio transmission measurement.

Along a first axis (x-axis) 311, the frequency of the received signal is illustrated.

Along a second axis (y-axis) 312, the received power (in dBm) is illustrated.

The center frequency is 5.8 GHz, the horizontal scale is 200 Hz/div and the vertical scale is 10 dB/div.

The sector antenna has a reduced higher frequency peak 314 compared with the Omni-directional antenna (see FIG. 3A) by more than 30 dB compared to the lower frequency peak 313 and hence, minimized the Intra Channel Interference (ICI).

The channel may be modeled using a two-ray model when Line Of Sight (LOS) is dominant. In a sea port, when a sector antenna is used, the received signal strength at any location can be calculated using the two-ray model to represent the dominant peak. However, when an Omni-directional antenna was used, as illustrated in FIG. 3A, there were two dominant peaks. The received signal strength for each peak may be represented by a two-ray model. Hence, for two dominant peaks, a four-ray model may be seen to be required to model the received signal strength. This is illustrated in FIG. 4.

Figure 4:
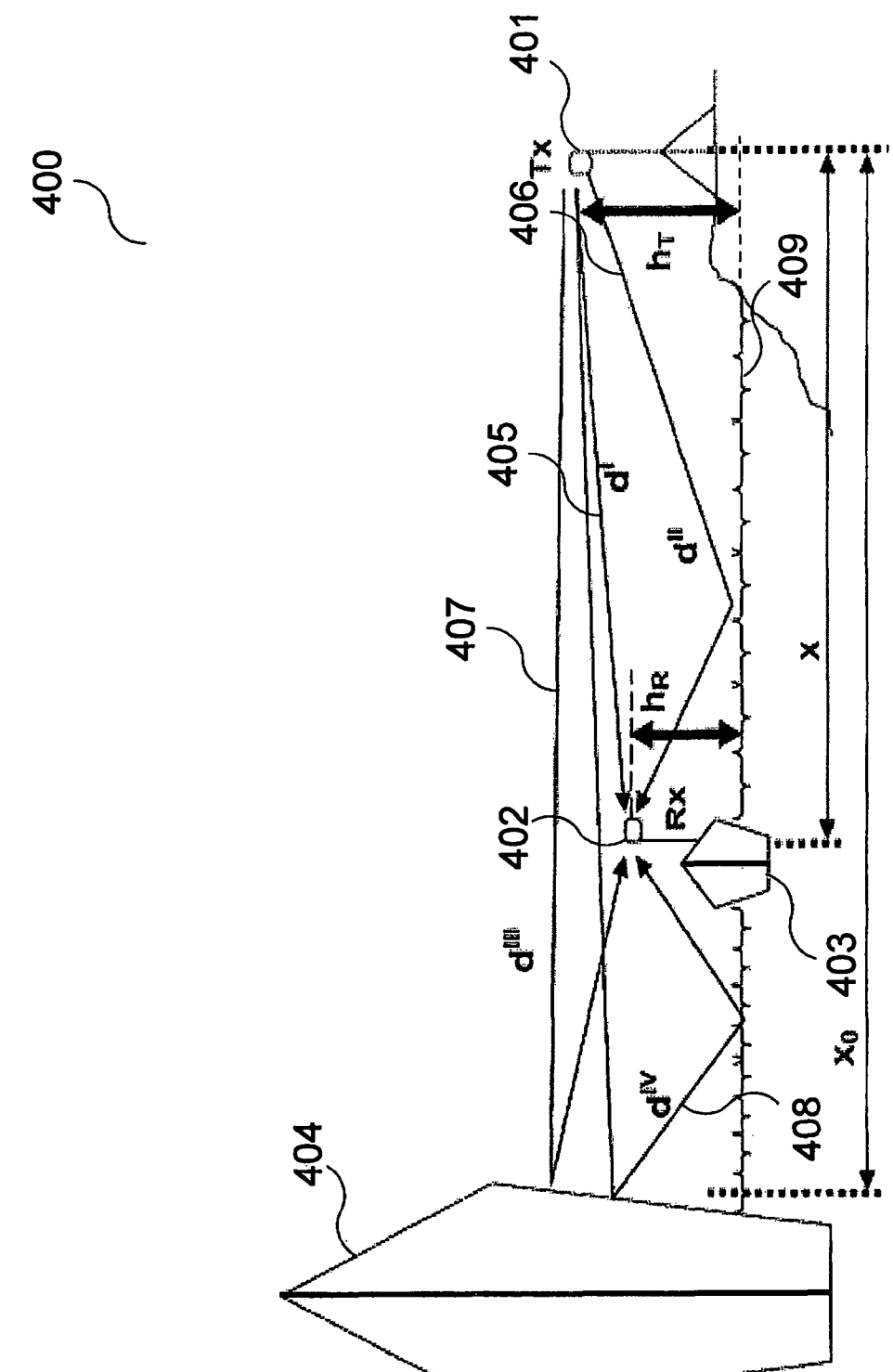
FIG. 4 shows a communication arrangement for illustration of a four-ray signal transmission model.

FIG. 4 shows a communication arrangement 400 for illustration of a four-ray signal transmission model.

The arrangement 400 includes a transmitter 401, a receiver 402 (shown to be located on a small boat 403), a reflector 404, in this example being formed by a ship, and the sea surface 409. A first component 405 of the signal transmitted by the transmitter 401 follows a path directly from the transmitter 401 to the receiver 402. A second component 406 of the signal transmitted by the transmitter 401 is reflected by the sea surface 409 towards the receiver 402. A third component 407 of the signal transmitted by the transmitter 401 is reflected by the reflector 404 towards the receiver 402. A fourth component 408 of the signal transmitted by the transmitter 401 is reflected by the reflector 404 towards the sea surface 409 and is then reflected by the sea surface 409 towards the receiver 402. The four signal components 405, 406, 407, 408 may be seen as the four rays of the four-ray model.

Assuming perfect reflection by the sea surface, the total signal power received by the receiver was calculated and plotted using theoretical models. This plot was then compared with the RSSI (received signal strength indicator) reading obtained from the fixed transmitter-receiver system (in this case a WiMAX system). The results are illustrated in FIG. 5.

Figure 5:
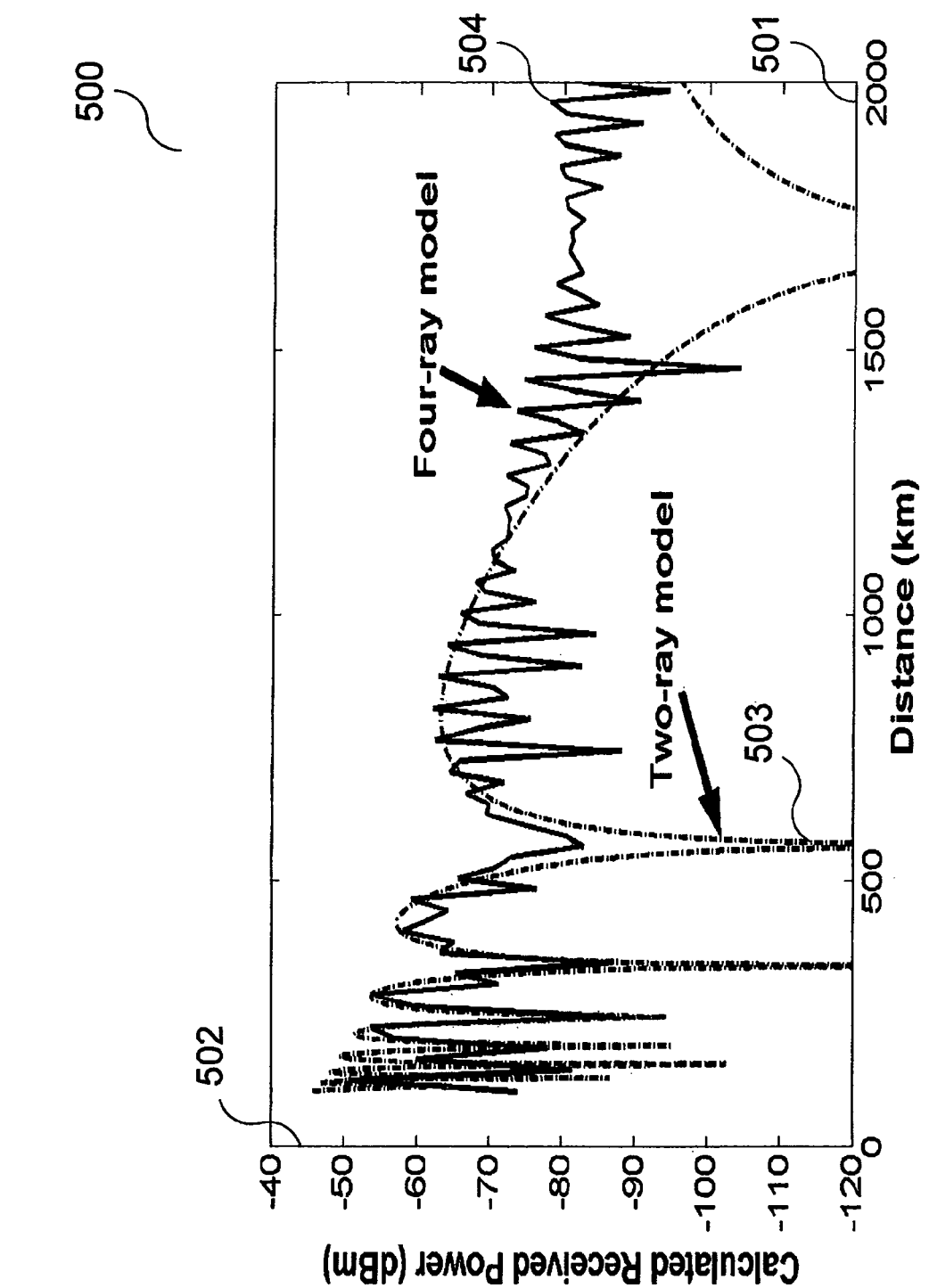
FIG. 5 shows a graph illustrating theoretical results of a radio transmission modeling.

FIG. 5 shows a graph 500 illustrating theoretical results of a radio transmission modeling.

Along a first axis (x-axis) 501, the transmitter-receiver distance is illustrated.

Along a second axis (y-axis) 502, the calculated received power (in dBm) is illustrated.

A first curve 503 shows the results obtained using a four-ray model and a second curve 504 shows the results obtained using a two-ray model.

These two curves 503, 504 should represent the power received by a fixed WiMAX when an Omni-directional antenna (curve 503) and a sector antenna (curve 504) are used, respectively. The number of points plotted is the same as the number of points acquired by the fixed WiMAX system on the boat over the range of 200 m to 2200 m from the transmitter position A (cf. the map section 200). The curve 504 of the two-ray model varies between peak and null much slower compared to the curve 503 of four-ray model.

To verify that the power received by the fixed WiMAX is similar to that shown in FIG. 5, the transmitter and the receiver were replaced by a fixed WiMAX system to collect RSSI readings on a similar path along position B to position S. The results are illustrated in FIG. 6.

Figure 6:
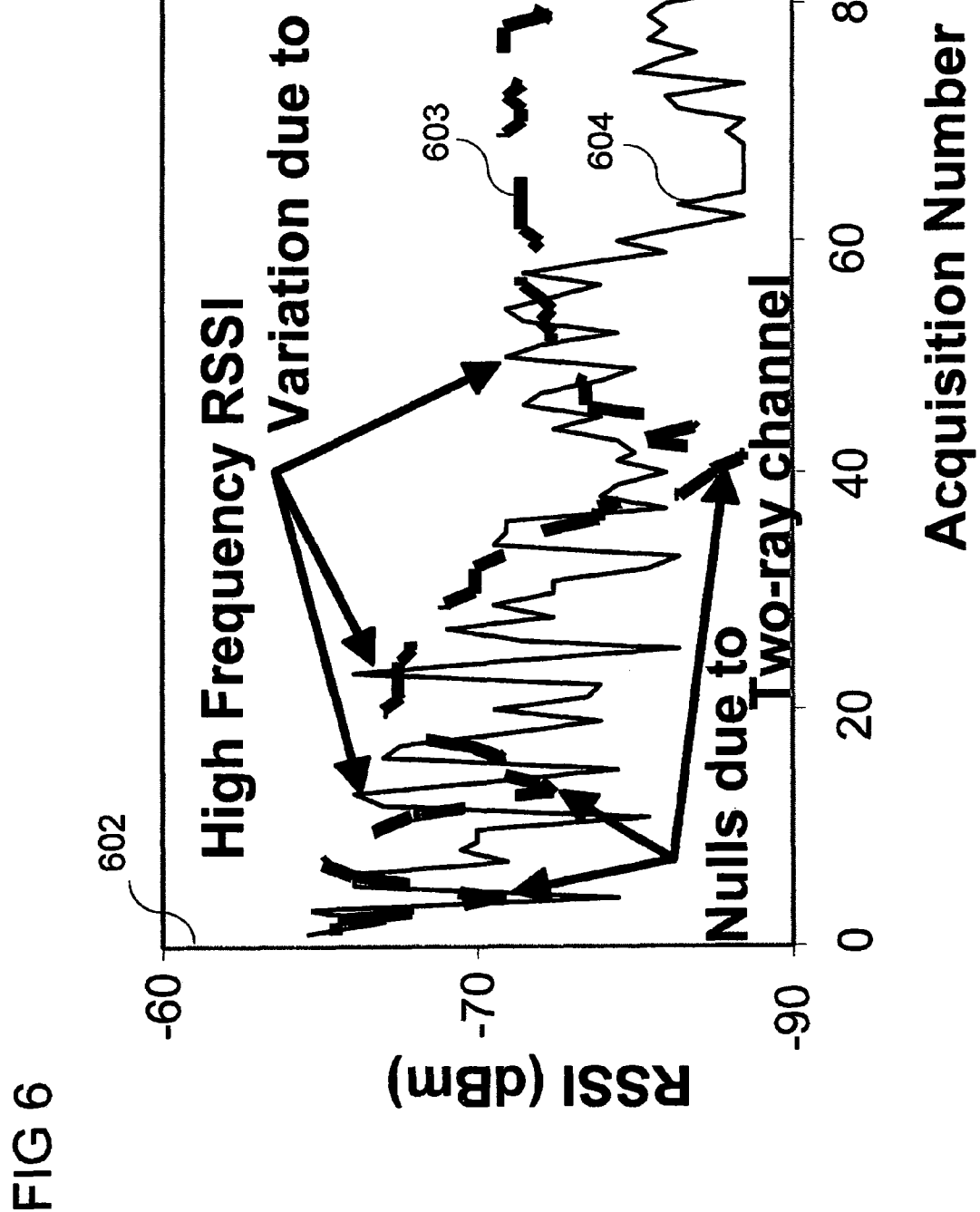
FIG. 6 shows a graph illustrating results of a radio transmission measurement.

FIG. 6 shows a graph 600 illustrating results of a radio transmission measurement.

Along a first axis (x-axis) 601, the acquisition numbers of the respective received signal samples are illustrated.

Along a second axis (y-axis) 602, the measured received signal strength indicator (in dBm) is illustrated.

A first curve 603 (shown dashed) shows the fixed WiMAX RSSI at the client site (receiver) using a sector antenna (dash) and a second curve 604 (shown solid) shows the fixed WiMAX RSSI at the client site (receiver) using an Omni-directional antenna.

There were 100 RSSI readings (each being associated with an acquisition number) for each antenna as the boat moved from position B to position S (cf. FIG. 2). When a sector antenna was used, there was only one dominant peak (cf. FIG. 3B). The RSSI according to the first curve 603 behaves similar to the calculated received power using the two-ray model (cf. FIG. 5). When an Omni-directional antenna was used, there were two dominant peaks (cf. FIG. 3A). The RSSI according to the second curve 504 behaves similar to calculated received power using the four-ray model (cf. FIG. 5). The two dominant Doppler shifted signals may be seen to mix with each other to produce high frequency RSSI variation. When the RSSI fell below the receiver sensitivity of the fixed WiMAX, the fixed WiMAX temporarily lost connection, which contributed to a higher BER (bit error rate). This high frequency RSSI variation occurred even when the boat was close to position A (cf. the second curve 604, acquisition numbers 0-20). This is why irreducible BER and FER (frame error rate) floor were present during the measurements.

To confirm no irreducible BER floor when only one Doppler shifted signal is dominant, a sector antenna was used instead of an Omni-directional antenna at the client site. BER and FER measurements using the fixed WiMAX were carried out following the same boat path. The RSSI did not vary as fast as that corresponding to Omni-directional antenna. The results are shown in FIGS. 7A and 7B.

Figure 7A:
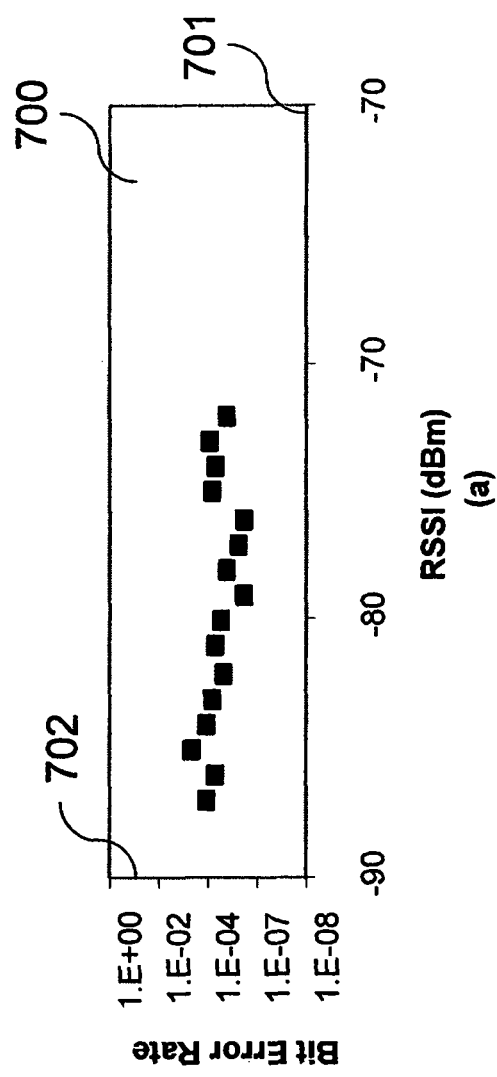
FIGS. 7A and 7B show a first graph and a second graph illustrating results of a radio transmission measurement.
Figure 7B:
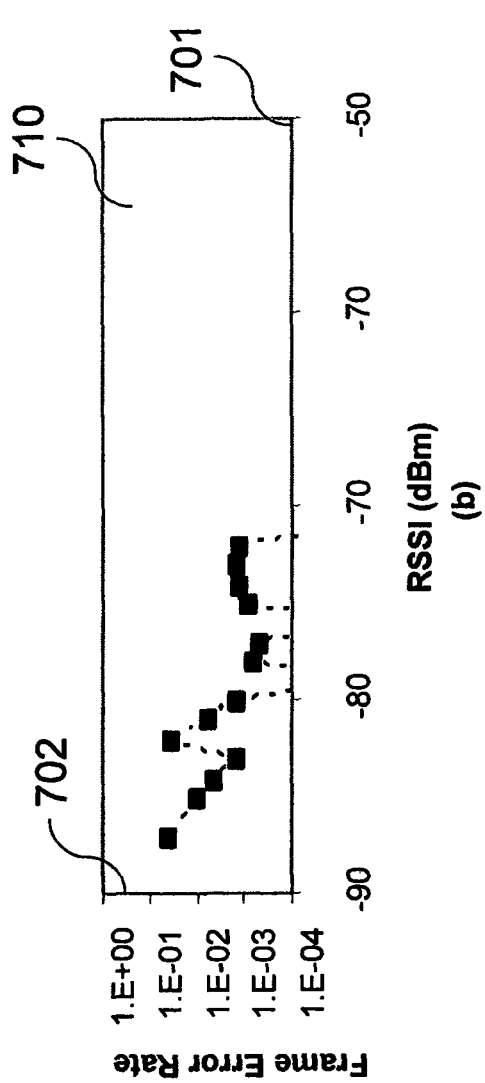

FIGS. 7A and 7B show a first graph 700 and a second graph. 710 illustrating results of a radio transmission measurement.

Along a respective first axis (x-axis) 701, the RSSI (in dBm) of the received signals are illustrated.

Along a respective second axis (y-axis) 702, the measured bit error rate (FIG. 7A) and the measured frame error rate (FIG. 7b) of the received signals are illustrated, respectively.

It can be seen that the BER is less than $10^{-8}$ when RSSI>−71 dBm. The FER dropped below $10^{-4}$ when RSSI exceeded −71 dBm. As expected, the irreducible BER floor is no longer present. This result shows that the use of a sector antenna shows tremendous benefit in the deployment of the network. In the experiment, a 60° horizontal plane directive antenna has been used. The more directive the antenna toward the transmitter, the better the performance is but the more difficult it is to align the antenna toward the transmitter due to boat's movements.

From the measurements, it can be observed that a sectorized approach to packet reception is helpful to mitigate the Doppler and unwanted reflections from nearby metal bodies. The sectorized approach can be seen as a requirement fulfilled by some embodiments. A sectorized approach may be seen to be challenging because reception along all sectors has to be done concurrently so that the delay in the communication network is not compromised.

In addition to the reflections occurring in a sea or shore environment, boat's or ship's movements may affect the received signal and lead to variation in the received signal strength. The standard deviation of a signal received using a directive antenna due to this movement can be as high as 5 dB which is quite significant. This effect is explained in the following with reference to a communication arrangement according to one embodiment as shown in FIG. 8.

Figure 8:
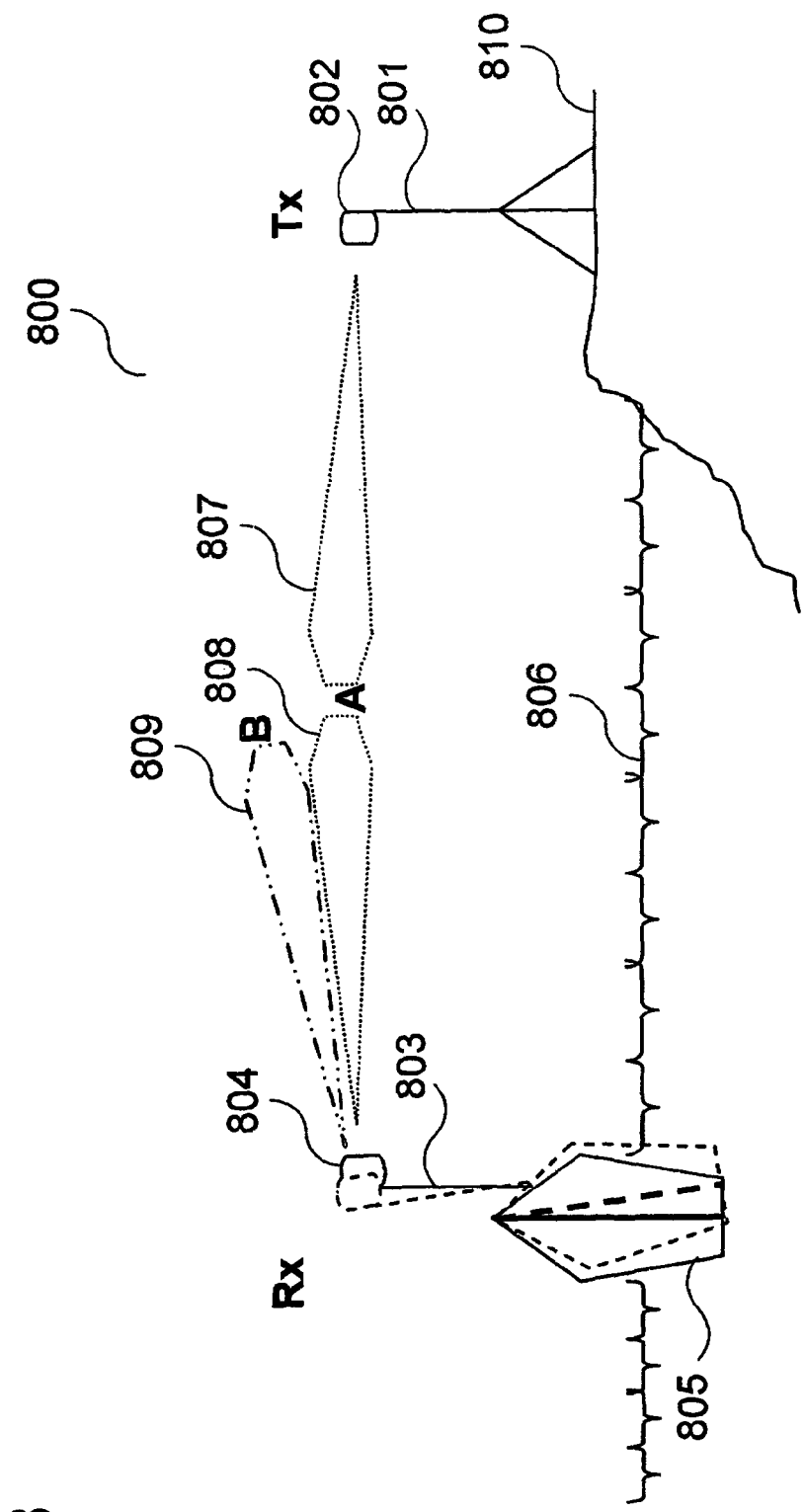
FIG. 8 shows a communication arrangement according to an embodiment.

FIG. 8 shows a communication arrangement 800 according to an embodiment.

The communication arrangement 800 includes a transmitter 801 including a transmit antenna 802. The transmitter 801 is in this example located on the shore 810. The communication arrangement 800 further includes a receiver 803 including a receiving antenna 804. The receiver 803 is located on a ship 805 located on the sea surface 806.

If the ship 805 is perfectly stationary, the receiver 803 will have a constant signal strength received because the alignment of the receiving antenna 804 with the transmit antenna 802 remains the constant. Both antennas 803, 804 are in this case pointing towards a point A (cf. the map section 200), i.e. their respective directivity, illustrated by a first cone 807 and a second cone 808 is such that signals may be transmitted from the transmitter 801 to the receiver 803 with high gain.

In one embodiment, as will be explained below, the directivity of the receiving antenna 804 (which may be formed by an antenna arrangement including a plurality of antennas) is changed when the ship 805 rocks, e.g. by changing the activated antenna of the antenna arrangement forming the receiving antenna 804. In one embodiment, this may be seen to serve to avoid the effect illustrated in FIG. 8 when the ship rocks: When the ship starts rocking, the antenna alignment between the transmit antenna and the receiver antenna (with regard to its original directivity) is disrupted. The transmit antenna's directivity as indicated by the first cone 807 is still aligned with point A while the receiving antenna's original directivity indicated by the third cone 809 is aligned with point B.

Therefore, in one embodiment, to avoid changes in the received signal strength, the directivity of the receiving antenna 804 is changed when a movement, e.g. a movement caused by a rocking movement of the ship 805, of the receiving antenna 804 is detected.

Figure 9:
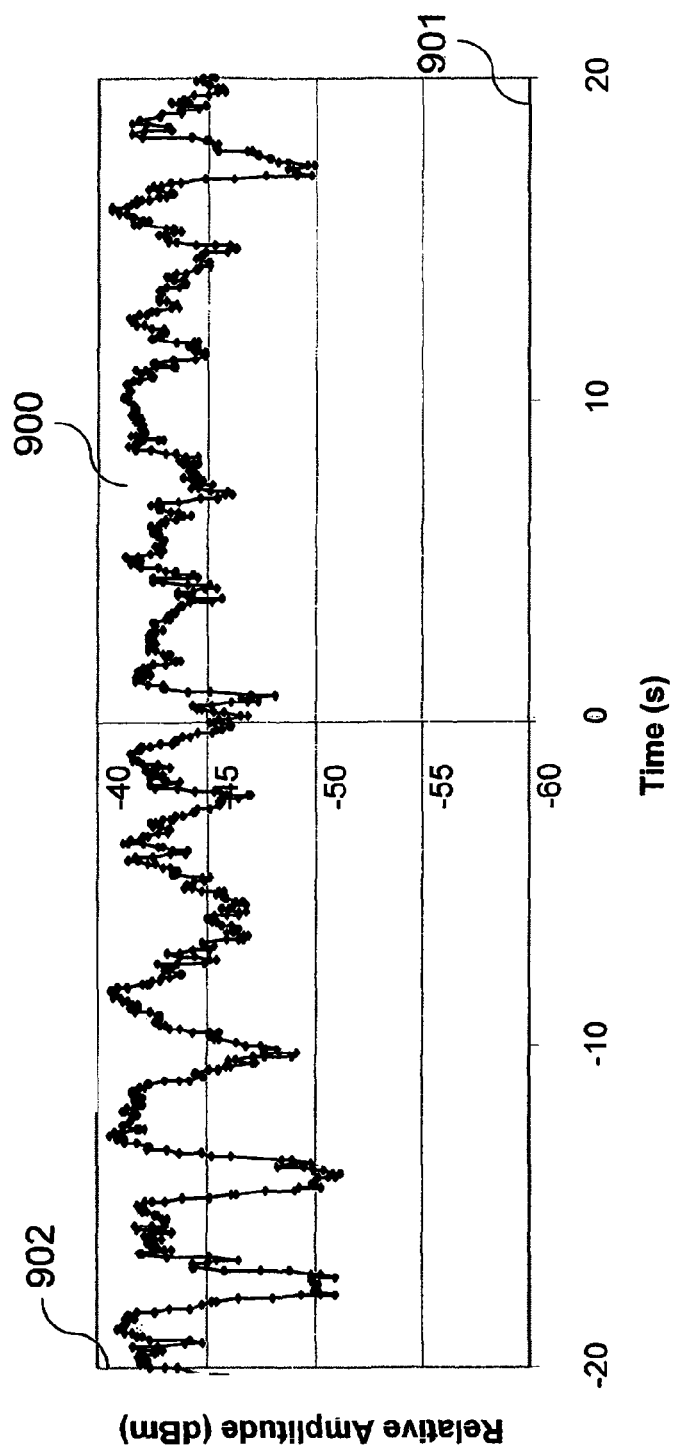
FIG. 9 shows a graph illustrating results of a radio transmission measurement.

Changes in the received signal strength caused by a ship's movement due to waves that may be avoided according to one embodiment are illustrated in FIG. 9.

FIG. 9 shows a graph 900 illustrating results of a radio transmission measurement.

Along a first axis (x-axis) 901 time is illustrated.

Along a second axis (y-axis) 902, the relative measured amplitude of the received signal (in dBm) is illustrated.

The graph 900 is based on a measurement in which the ship carrying the receiver antenna is positioned 500 m away from the transmitter. The transmitter is on the shore. It can be seen that the received signal varies significantly as the ship is rocked by the waves. Depending on the antenna used, the variation can be as high as 10 dB.

As explained above, it may be observed that propagation in a sea environment may introduce impairment in the data packet reception. In a mesh network, where multi-hop relaying is performed, there is typically a strong reliance on use of broadcast messages. Also, due to the distributed nature of the MAC (Medium Access Control) protocols used in mesh networks, it may not be possible to schedule broadcast signals in some predetermined slots and even if this is possible, it is very difficult to decide the direction of an incoming broadcast packet. Thus, it may be considered that the design of a mesh node has to be based on the use of a 360° reception. In addition to this, it may be seen as being necessary that transmission of broadcast packets has to be done in all directions such that all neighbors are aware of the MAC states.

Embodiments address (at least some of) the following features for ensuring an optimal solution for the mesh radios.
 Reducing the power from the reflected wave in the 2-ray propagation towards a node;
 Reducing the reflection or reception of signals from metal bodies in the surroundings;
 Mitigate Doppler Effect;
 Reducing sea surface reflection from transmitting node while keeping transmitted power high;
 Keeping antenna gains high such that links can be longer to ensure better connectivity in mesh networks;
 Reducing power loss due to ship's movement (pitch, roll, yaw);
 Having low cost;
 Possibility of reception in 360° to handle broadcast packets;
 No losses in delay when compared to an Omni-directional network setup without impairments;
 Transmission in 360° to handle broadcast packets.

It may be considered as being challenging to find a solution that balances all the features above.

The inherent design of the waveform used may be used to cater for certain features such as mitigation of effects of Doppler, slow fading and fast fading. However, for the maritime usage and the use in Ships which are subject to movement due to sea conditions further improvements are desirable. According to some embodiments, configurations which may be seen to be on a combination of antenna diversity techniques and MAC design are provided to meet the requirements for a maritime mesh network.

Figure 10:
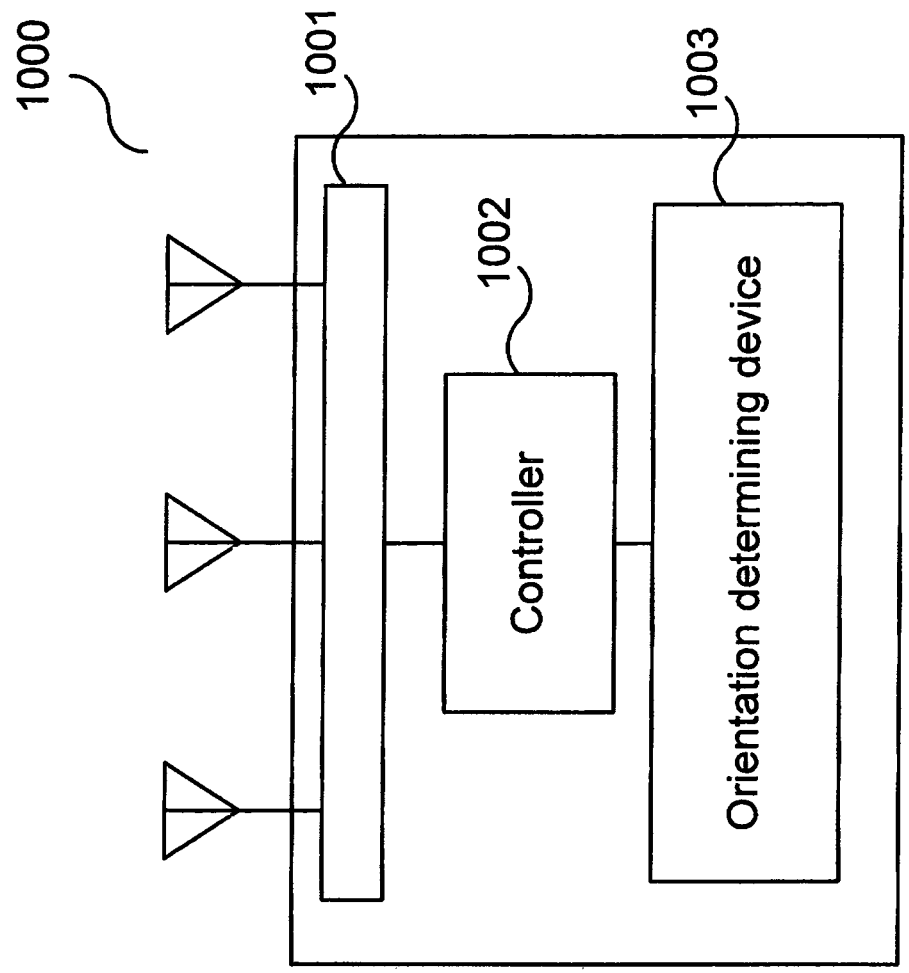
FIG. 10 shows a communication device according to an embodiment.

According to one embodiment, a communication device is provided as illustrated in FIG. 10.

FIG. 10 shows a communication device 1000 according to an embodiment.

The communication device 1000 includes an antenna arrangement 1001, an orientation determining device configured to determine the orientation of the antenna arrangement 1002 and a controller configured to control the directivity of the antenna arrangement based on the determined orientation of the antenna arrangement.

In one embodiment, in other words, the directivity of an antenna arrangement is adapted to the orientation of the antenna arrangement in space, e.g. adapted to changes of its orientation due its movements. The directivity may for example be controlled with respect to a reference point, e.g. such that from the point of view of the reference point, e.g. another communication device, the directivity of the antenna arrangement stays (largely) constant even if the orientation of the antenna arrangement changes. For example, the directivity of the antenna arrangement may be controlled such that the directivity of the antenna arrangement in the direction of the reference point is above a pre-defined threshold or such that the maximum antenna gain is achieved in the direction to the reference point. For example, the antenna arrangement is mounted on a boat or ship and the reference point is located on the shore and the directivity is controlled to compensate for the changes of orientation of the antenna arrangement, e.g. due to rocking movements of the boat or ship.

The communication device is for example a node of a mesh communication network, or, in other words, a communication device of an ad hoc communication network.

In one embodiment, the orientation of antenna arrangement is determined based on the orientation of the communication device.

In one embodiment, the antenna arrangement includes a plurality of antennas and the controller is configured to activate at least one of the plurality of antennas based on the determined orientation of the antenna arrangement. The controller may also control the signal phase differences between the antennas to change the directivity of the antenna arrangement or control the directivity of the antenna arrangement by other means, e.g. by tilting at least one antenna of the antenna arrangement, e.g. with respect to a base of the antenna arrangement.

According to one embodiment, the directivity of the antenna arrangement is controlled such that a transmitted signal is received along two paths and the transmitted signal is received as a first received signal and as a second received signal.

For example, the antenna arrangement includes a plurality of antennas and the controller is configured to activate at least two of the plurality of antennas based on the determined orientation of the antenna arrangement such that the transmitted signal is received as the first received signal by an activated first antenna of the plurality of antennas and the transmitted signal is received as the second received signal by an activated second antenna of the plurality of antennas.

The communication device may further include a combining circuit configured to generate a received signal for further processing based on the first received signal and the second received signal. The combining circuit may also be configured to generate a received signal for further processing based on signals received from different antenna arrangements.

The combining circuit is for example configured to select the received signal for further processing based on the first received signal and the second received signal.

The combining circuit may be configured to generate the received signal for further processing by combining the first received signal and the second received signal.

The combining for example includes a phase shifting of at least one of the first received signal and the second received signal.

The phase shifting is for example carried out based on the determined orientation of the antenna arrangement.

In one embodiment, the communication device includes an antenna structure including the antenna arrangement and at least one further antenna arrangement.

The communication device may further include a controller configured to control the directivity of the at least one further antenna arrangement based on the determined orientation of the antenna arrangement.

The antenna arrangement and the at least one further antenna arrangement may for example be arranged in the antenna structure to cover different sectors.

For example, the antenna arrangement and the at least one further antenna arrangement are arranged in the antenna structure to cover different sectors of a first plane in space and the controller is configured to control the directivity of the antenna arrangement in a second plane in space.

In one embodiment, the antenna arrangement includes a plurality of antennas arranged to cover different sectors in the second plane and the controller is configured to activate at least one of the plurality of antennas based on the determined orientation of the antenna arrangement.

In one embodiment, the at least one further antenna arrangement includes at least one further plurality of antennas arranged to cover different sectors in the second plane and the controller is configured to activate at least one of the at least one further plurality of antennas based on the determined orientation of the antenna arrangement.

The first plane and the second plane are for example perpendicular. For example, the first plane is the horizontal plane and the second plane is the vertical plane.

In one embodiment, the communication device includes a receiver and at least one further receiver and the receiver is configured to receive signals via the antenna arrangement and the at least one further receiver is configured to receive signals via the at least one further antenna arrangement.

In one embodiment, the communication device includes a transmitter configured to transmit a signal via the antenna arrangement and the at least one further antenna arrangement.

In one embodiment, the antenna arrangement is mounted on a boat or ship and the orientation determining device is configured to determine the orientation of the antenna arrangement based on a determined orientation of the boat or ship.

The orientation determining device for example includes a gyroscope.

Orientation may refer to an orientation of the antenna arrangement in space, e.g. an inclination of the antenna arrangement with respect to a reference plane such as the horizontal plane.

Figure 11:
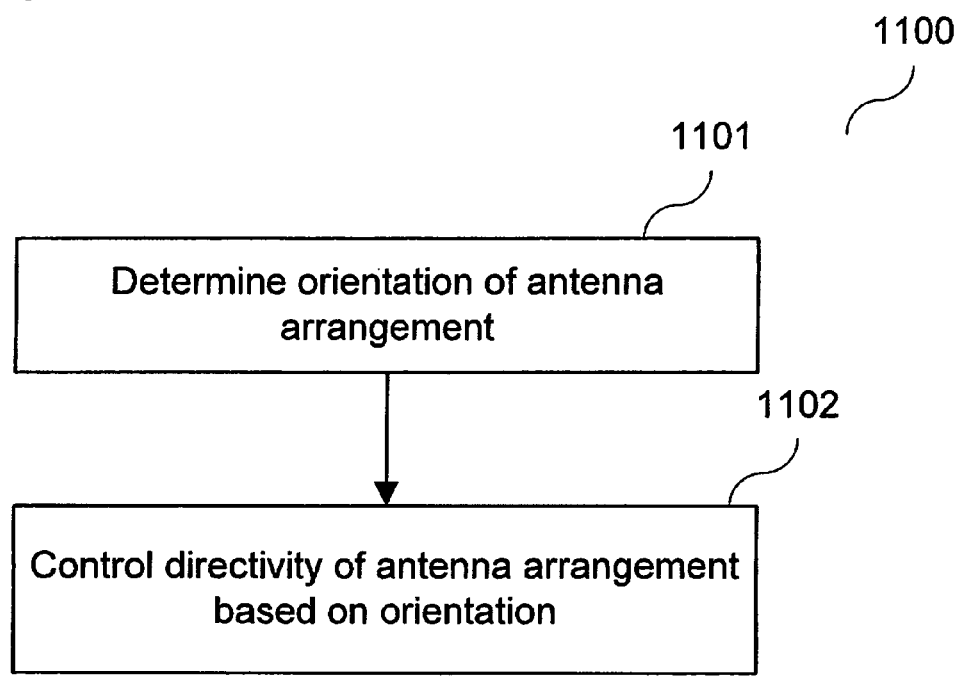
FIG. 11 shows a flow diagram according to an embodiment.

According to one embodiment, a method is carried out, e.g. by the communication device 1000, as illustrated in FIG. 11.

FIG. 11 shows a flow diagram 1100 according to an embodiment.

The flow diagram 1100 illustrates a method for controlling an antenna arrangement.

In 1101, the orientation of the antenna arrangement is determined.

In 1102, the directivity of the antenna arrangement is controlled based on the determined orientation of the antenna arrangement.

In the embodiments described in the following, a combination of several sectorized antenna is used to achieve 360° coverage. An example setup to achieve 360° coverage using four units of 90° directive antennas to address all the requirements above is described in the following with reference to FIG. 12. Another example could be based on 6 units of 60° antennas to cover 360°.

Figure 12:
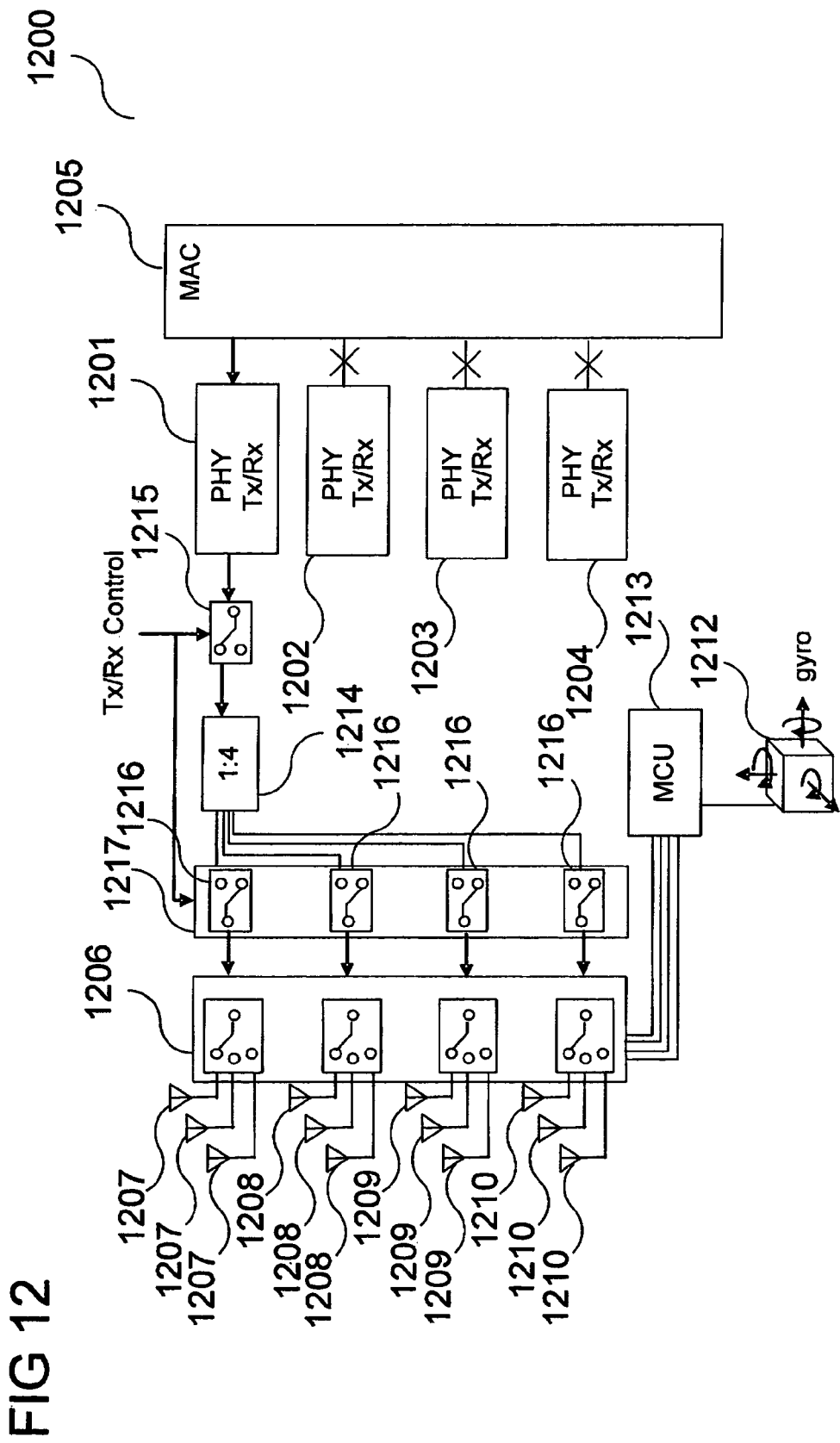
FIG. 12 shows a communication device according to an embodiment.

FIG. 12 shows a communication device 1200 according to an embodiment.

In this example, there is no angular diversity for the received signal. The communication device 1200 includes a first transceiver 1201, a second transceiver 1202, a third transceiver 1203, and a fourth transceiver 1204. The transceivers 1201, 1202, 1203, 1204 are for example implemented as transceiver cards, e.g. according to 802.11a or another communication standard. The communication device 1200 is for example a single wireless mesh node.

The transceivers cards 1201, 1202, 1203, 1204 for example provide the front-end and baseband processing of a received signal or a signal to be transmitted, respectively.

The communication device 1200 includes a MAC protocol stack circuit 1205 controlling the transceivers 1201, 1202, 1203, 1204. The transceivers 1201, 1202, 1203, 1204 may be controlled by a single computer, e.g. a personal computer.

The MAC protocol stack circuit 1205 may control the transceivers 1201, 1202, 1203, 1204 according to a common MAC protocol stack.

The communication device 1200 includes an antenna select block 1206 coupled with a first antenna arrangement including first antennas 1207, a second antenna arrangement including second antennas 1208, a third antenna arrangement including third antennas 1209, and a fourth antenna arrangement including fourth antennas 1210.

Each antenna arrangement covers a sector, in this case, a 90° (horizontal) sector, and includes a plurality of antennas 1207, 1208, 1209, 1210. In this example configuration, three antennas are used for each 90° sector, i.e. each antenna arrangement includes three antennas.

The placement of the antennas may be configured in an overlapping manner to provide a certain vertical angular coverage of the respective horizontal sector. For example, an antenna arrangement may include three antennas with 90° horizontal beam width and 5° vertical beam width to provide an overlapping 15° Vertical beam width. The vertical beam width of the antennas may have other narrow angle values and not necessarily 5°. The vertical beam width of the antennas may be selected based on the distance (from the transmitter to receiver) and the performance of the antennas to mitigate the multipath reflection effects that have been described above.

Figure 13A:
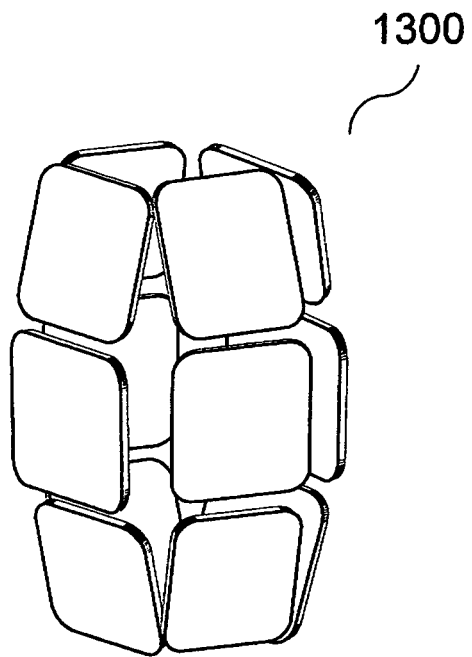
FIGS. 13a and 13b show antenna structures according to embodiments.
Figure 13B:
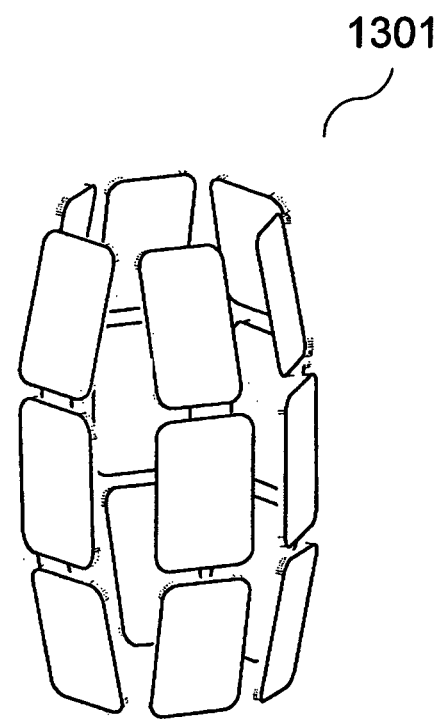

FIGS. 13*a* and 13*b* show antenna structures 1301, 1302 according to embodiments.

The antenna structures 1301, 1302 for example correspond to the antenna structure formed by the first antenna arrangement, the second antenna arrangement, the third antenna arrangement and the fourth antenna arrangement of the communication device 1200.

For the first antenna structure 1301, a 90° horizontal beam width is used and for the second antenna structure 1302, a 60° horizontal beam width is used to have a 360° coverage in each case. Another example configuration of an antenna structure is shown in FIG. 14.

Figure 14:
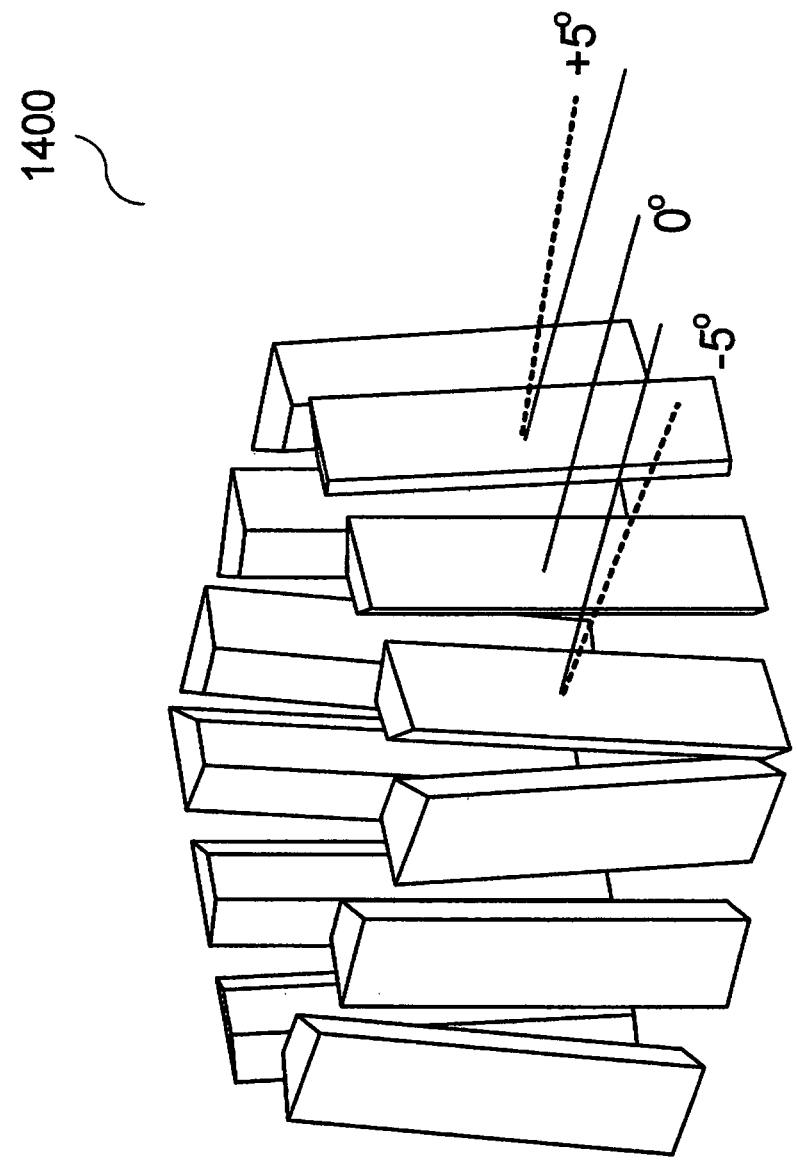
FIG. 14 shows an antenna structure according to an embodiment.

FIG. 14 shows an antenna structure 1400 according to an embodiment.

Similarly to the antenna structure 1301, 1302, the antenna structure 1400 may be used as the antenna arrangements of the communication device 1200.

The antenna structure 1400 includes four antenna arrangements wherein each antenna arrangement is configured to cover 90°. Each antenna arrangement includes three antennas (e.g. in the form of antenna panels) wherein the antennas of each antenna arrangement have a different inclination. In this example, each antenna of the antenna arrangement 1400 has a 90° horizontal beam width and a 90° vertical beam width.

The communication device 1200 includes a gyroscope (gyro) 1212 that provides information about the communication device's movement, e.g. about the ship's movements in case that the communication device 1200 is installed on a ship. The gyroscope 1212 may be seen as an orientation determining device configured to determine the orientation of the antenna arrangements of the communication device 1200.

The communication device 1200 includes a controller 1213 which controls the antenna select block 1206 based on the information provided by the gyroscope 1212 to select one of the antennas for each antenna arrangement. The controller 1213 may be seen to control the directivity of the antenna arrangements by selecting a respective antenna.

The antenna of an antenna arrangement is for example selected such that the impact of the movement of the communication device 1200 (or, in other words, the change of the orientation of the antenna arrangement with regard to, for example, a transmitter or a receiver) is alleviated in the respective horizontal 90° sector.

The gyroscope 1212 (gyro) may for example provide information about the yaw, pitch and roll angles of the ship. This information (digital or analog) is processed by the controller 1213 (e.g. implemented by a microprocessor). The controller 1213 outputs control signals to control the antenna select block to select, for each antenna arrangement, an antenna of the array of antennas of the antenna arrangement in the particular sector.

In one embodiment, the controller 1213 is realized by the computer controlling the transceivers 1201, 1202, 1203, 1204 and may for example be controlled by the computer via a GPIO (general purpose input/output) card.

In one embodiment, an antenna panel is selected along a vertical axis in a sector such that the selected antenna panel is the one nearest to perpendicular to the earth's horizontal plane among the antenna panels of the antenna (panel) arrangement. Thus, in operation, in one embodiment, when the ship sways, different antenna panels will be activated to maintain the reception and transmission antenna beam at a horizontal direction. In this way, when sending, the narrow beam emitted by the antenna arrangement is always forced to project out (nearly) horizontally in all directions of the mesh node. Thus, RF (radio frequency) energy directed to other angles contributing to destruction of signal (e.g. by reflection from the sea surface) or loss of signal (due to not being directed towards the recipient) may be reduced.

In FIG. 12, the communication device 1200 is shown set to transmit mode.

In this embodiment only a single transceiver 1201, 1202, 1203, 1204 is activated in transmit mode to supply the data packets (which are to be transmitted) to the antenna arrangements and the specific activated antennas (or antenna panels) of the antenna arrangements that have been selected based on the gyroscope information.

The frequency used for transmission or the channel used for transmission may be set to be the same for all sectors, i.e. for all antenna arrangements of the communication device 1200. By transmitting the same signal by all antenna arrangements may help to ensure a proper reception of the data packets transmitted at the neighboring nodes.

In one embodiment where all four transceivers 1201, 1202, 1203, 1204 are activated to send the same data packet (or data frame) from the MAC layer, it may be hard to synchronize the packet reception at a receiving node, especially when the receiving node is in some overlapping region of the sectorized beams. This is illustrated in FIG. 15.

Figure 15:
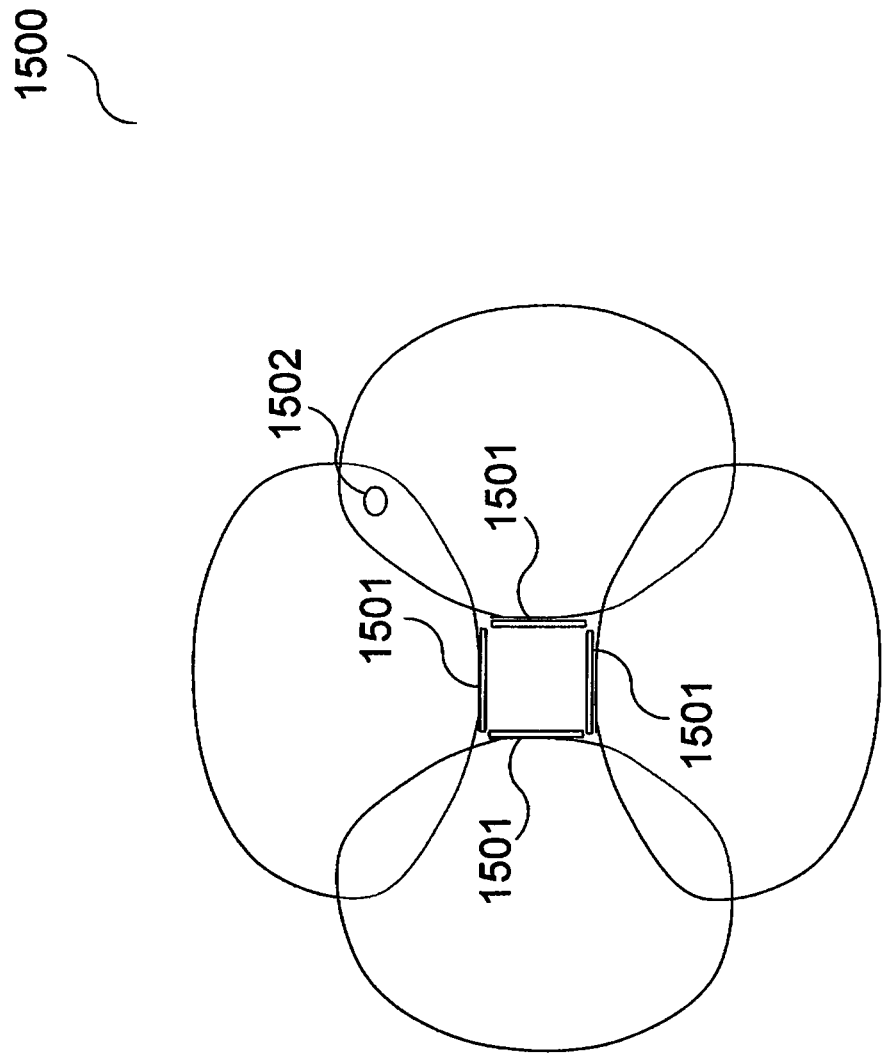
FIG. 15 shows a communication arrangement.

FIG. 15 shows a communication arrangement 1500.

The communication arrangement 1500 includes a plurality of antennas 1501 and a receiving communication device 1502.

FIG. 15 shows the case where the receiving node 1502 is situated in the overlapping region of two 90° transmitting antennas 1501.

In one embodiment, in a typical use scenario where there is direct line of sight between the transmitter and the receiver the loss in the received signal due to delay shifts between different transmit antennas can be assumed to be negligible because the distance between the two transmitting antennas to the receiver can be assumed to be almost similar.

When the communication device 1200 is in transmit mode, as illustrated in FIG. 12, the transmit signal is sent by the activated transceiver 1201 to a splitter 1214 of the communication device 1200 before being supplied to the four different antenna arrangements. A Tx/Rx select signal is supplied from the activated transceiver 1201 and is used to control the setting of a plurality of a first switch 1215 and a plurality of second switches 1216 of the communication device 1200, in this example to the transmit setting.

The second switches 1216 are for example arranged in a switching block 1217.

In one embodiment, a software approach through the manipulation of the PHY layer driver is used to disable the receivers of the transceivers 1202, 1203, 1204 to prevent the packet to be transmitted from flowing back to the sender (e.g. to the MAC layer).

Each antenna arrangement of the communication device 1200 may be provided with a transmit power amplifier and a low noise receive amplifier. These amplifiers may for example be arranged between the antenna select block 1206 and the switching block 1217. Thus, each transmission signal to be transmitted in a sector can be amplified to have a long transmission distance. Other amplification techniques may also be used. For example, a single transmit amplifier can be used that is arranged between the splitter 1214 and the first switch 1215, while several Low Noise receive Amplifier (LNAs) can be arranged in the receive paths of the communication device 1200 when the communication device 1200 is in receive mode as will be explained in the following with reference to FIG. 16.

Figure 16:
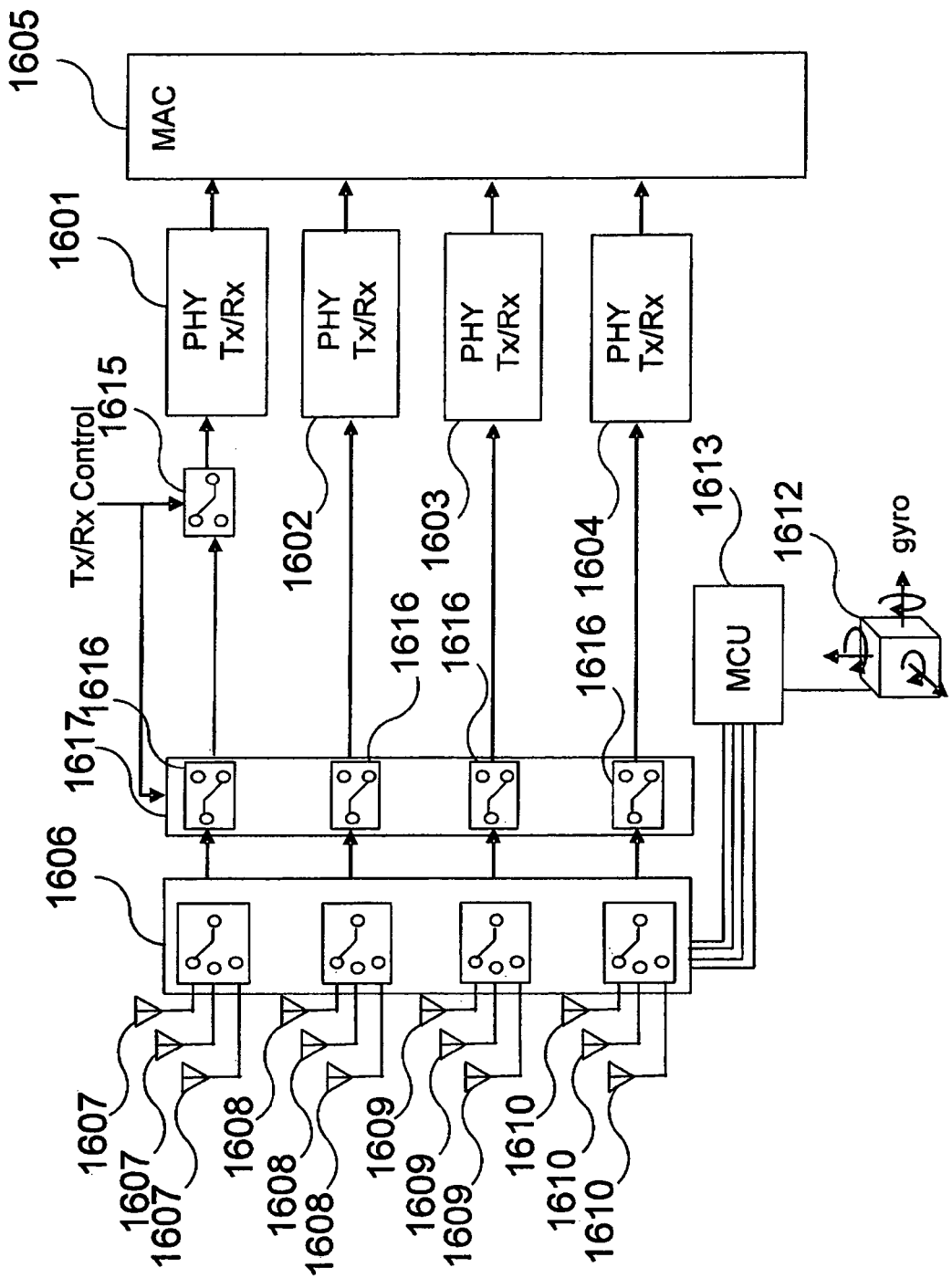
FIG. 16 shows a communication device according to an embodiment.

FIG. 16 shows a communication device 1600 according to an embodiment.

The communication device 1600 corresponds to the communication device 1200 shown in FIG. 12 but is shown in FIG. 16 set to receive mode.

Accordingly, the communication device 1600 includes a first transceiver 1601, a second transceiver 1602, a third transceiver 1603, a fourth transceiver 1604, a MAC layer protocol stack circuit 1605, e.g. implemented by a computer, an antenna select block 1606, a first antenna 1607, second antennas 1608, third antennas 1609, fourth antennas 1610, a gyroscope 1612, a controller 1613, a first switch 1615 and a switch block 1617 including a plurality of second switches 1616.

Since the splitter 1214 is not used in receive mode, it is not shown in FIG. 16.

In the receive mode, the Tx/Rx signal provided by one of the transceivers 1601 and that is supplied to the first switch 1615 controls the first switch 1615 to be set to receive mode.

In the receiving mode, all four transceivers 1601, 1602, 1603, 1604 are activated in this embodiment. In other words, the four transceivers 1601, 1602, 1603, 1604 independently receive data frames and pass it to the MAC layer, i.e. to the MAC layer protocol stack circuit 1605.

There are several benefits of the receiving operation according to the communication device 1600. Firstly, the problems that may arise from the four ray reflection scenario as described above with reference to figures shown in FIGS. 4, 5 and 6 may be avoided. An antenna arrangement covering a sector facing a reflected path likely receives a separate instance of a received packet with less interference compared to a scenario where an antenna receives signals along all paths.

The antenna arrangement covering a sector facing the intended transmitter also picks up an instance of the same data packet with less corruption compared to a scenario where an antenna receives signals along all paths.

In one embodiment, the data packets sent by a transmitter are tagged with a packet ID. The MAC layer protocol stack circuit 1605 may receive duplicate packets with same IDs via different antennas. In one embodiment, the MAC layer protocol stack circuit 1605 filters these packets and removes the duplicate packets before passing the packet to higher layers of the mesh node, i.e. the communication device 1600.

The second benefit of setting up the communication device 1600 in the receiving mode as illustrated in FIG. 16 may be seen in to keep the reception power high. By using a sectorized antenna structure, the receive power of received signals can be kept high, due to the higher gain of sectorized antennas.

A third benefit of sectorizing the receive path may be seen in that it helps to keep the receive antenna radiation plane constantly at a horizontal setting. With the help of the gyro 1612, each receive sector can be adjusted to receive an incoming signal at the horizontal plane. It should be noted that this is typically difficult to achieve when using an Omni-directional antennas unless an antenna with a wider vertical radiation pattern is used. However, an antenna with a wider vertical radiation pattern typically introduces stronger nulls at the receiver due to reflection and also warrants a stronger power amplifier because of the reduction in antenna gain when using an Omni-directional antenna.

Figure 17A:
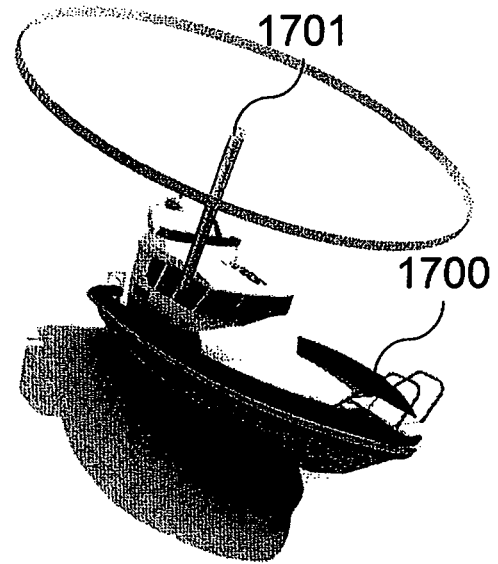
FIG. 17A shows a boat having an Omni-directional antenna 1701.
Figure 17B:
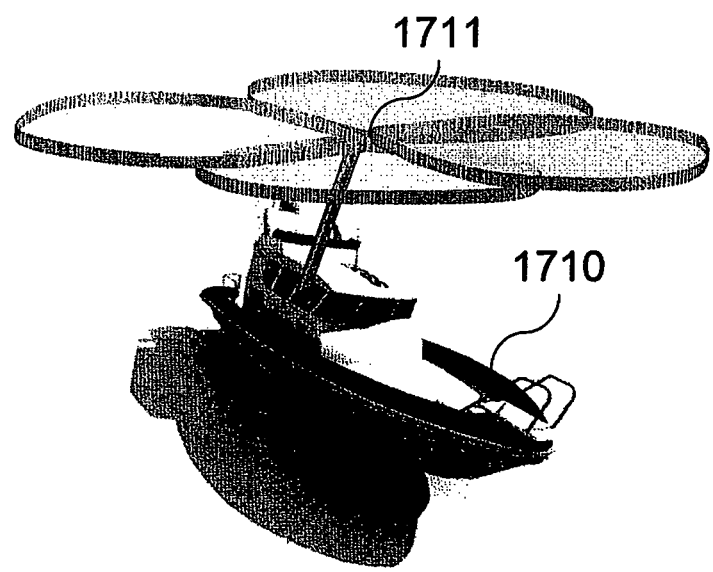
FIG. 17B shows a boat having a sectorized antenna 1711 according to an embodiment.

FIG. 17A shows a boat 1700 having an Omni-directional antenna 1701. FIG. 17B shows a boat 1710 having a sectorized antenna 1711 according to an embodiment.

FIGS. 17A and 17B illustrate the balancing of the receiving pattern with a configuration according to an embodiment (FIG. 17B) versus that possible with an Omni-directional antenna (FIG. 17A).

In the following, an embodiment is described that may be seen as a slight variation of the embodiment described above with reference to FIGS. 12 to 16.

In the embodiment described in the following, angular diversity is made use of in each of a plurality of antenna structure sectors. The embodiment may be seen to be based on the communication device 1200, 1600 as described with reference to FIGS. 12 and 16. However, in the configuration of the embodiment described in the following, the gyroscope 1200, 1600 selects two antenna panels in each of the sectors, i.e. of each antenna arrangement. This means that two antennas of an antenna arrangement may be active at the same time such that in one sector, a transmit signal may be received in the form of two received signals, one per activated antenna. The two signals received per sector are fed into two antenna ports present each transceiver 1201-1204, 1601-1602. Two antenna ports are typically present in transceiver cards, e.g. 802.11a transceiver cards. With the use of angular diversity, transmission probability and receive BER may be improved by selecting one of the received signals received in one sector as the signal used for further processing, e.g. for forwarding to higher communication layers. For example, one received signal is received along the main path (direct path) and another received signal is received along the reflected path as illustrated in FIG. 18.

Figure 18:
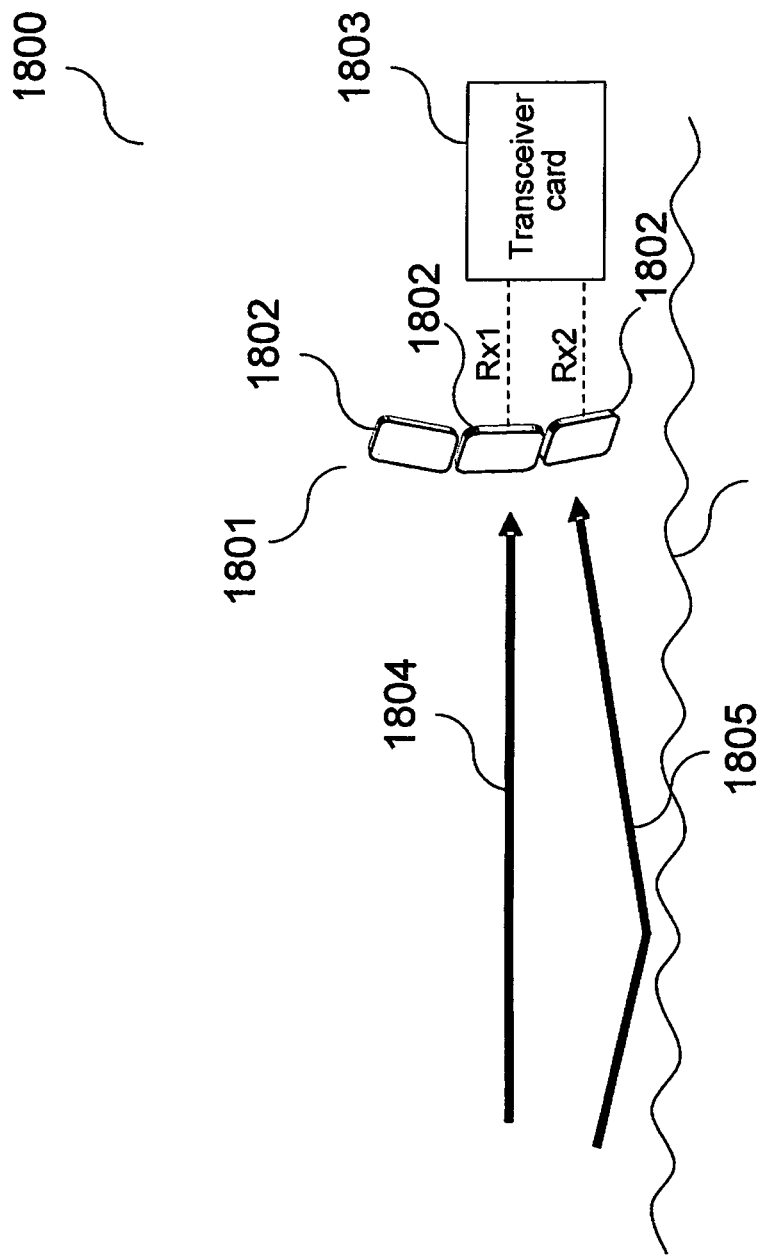
FIG. 18 shows a communication arrangement according to an embodiment.

FIG. 18 shows a communication arrangement 1800 according to an embodiment.

The communication arrangement 1800 includes an antenna arrangement 1801 including a plurality of antennas (e.g. antenna panels) 1802. Two antennas 1802 are activated at the same time and supply signals received to a transceiver card 1803 of the antenna arrangement 1800.

In this example, the middle antenna 1802 of the antenna arrangement 1801 receives a signal along a direct path 1804 from a transmitter. The bottom antenna 1802 of the antenna arrangement 1801 receives the signal along a reflected path 1805 from the transmitter in which the signal is reflected by the sea surface 1806 before receiving.

An example for an antenna switching system used in this embodiment is explained in the following with reference to FIGS. 19 and 20.

Figure 19:
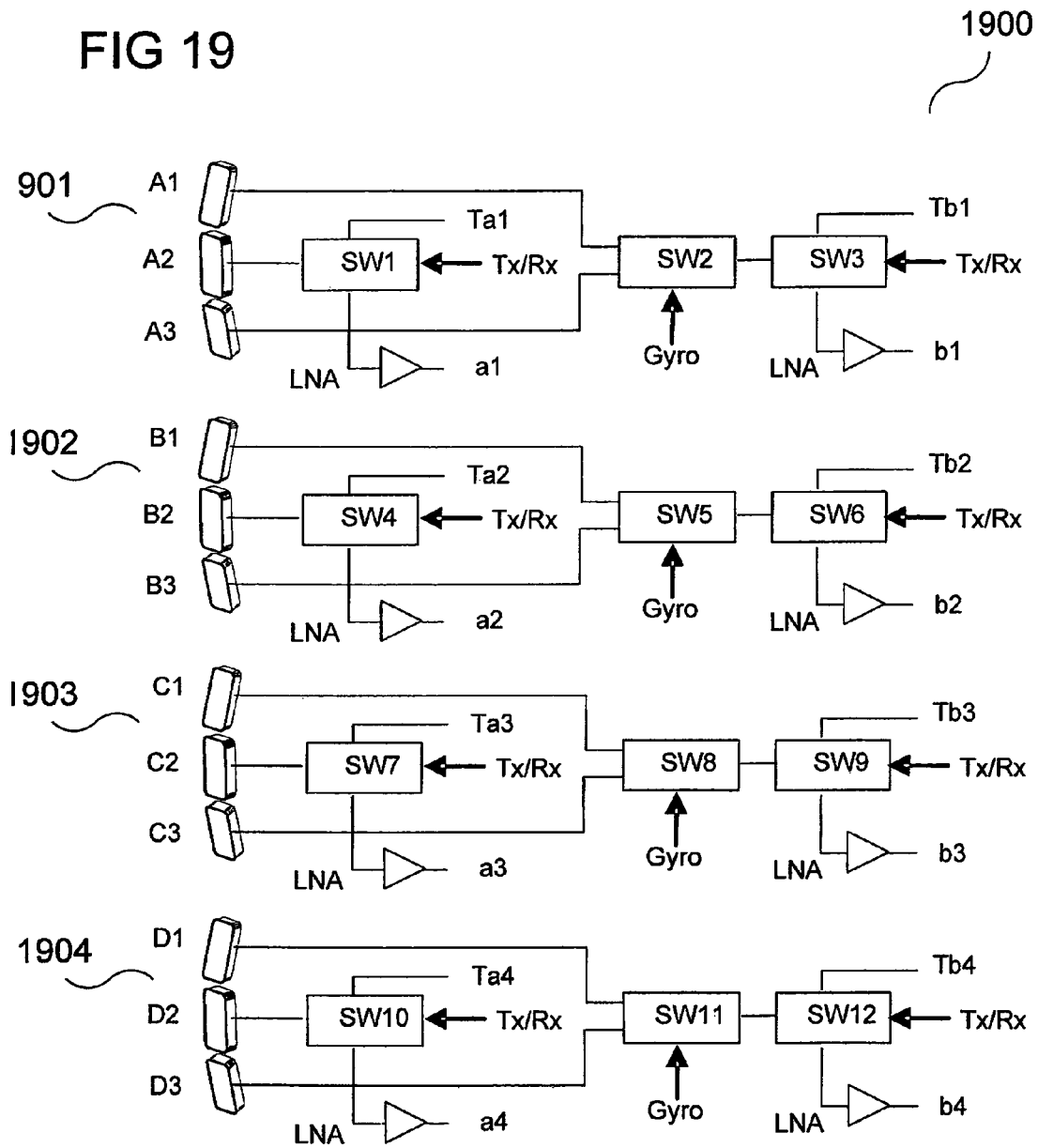
FIG. 19 shows a first part of an antenna switching system according to an embodiment.

FIG. 19 shows a first part of an antenna switching system 1900 according to an embodiment.

The antenna configuration of the first part of the antenna switching system 1900 is similar to the one of the communication device explained with reference to FIGS. 12 and 16, i.e. the first part of the antenna switching system 1900 includes four antenna arrangements 1901-1904, wherein each antenna arrangement 1901-1904 covers a (horizontal) sector and includes three antennas for covering different vertical angles.

Similarly to the communication device explained with reference to FIGS. 12 and 16, four transceiver cards (not shown in FIG. 19) are activated in the receive process.

Figure 20:
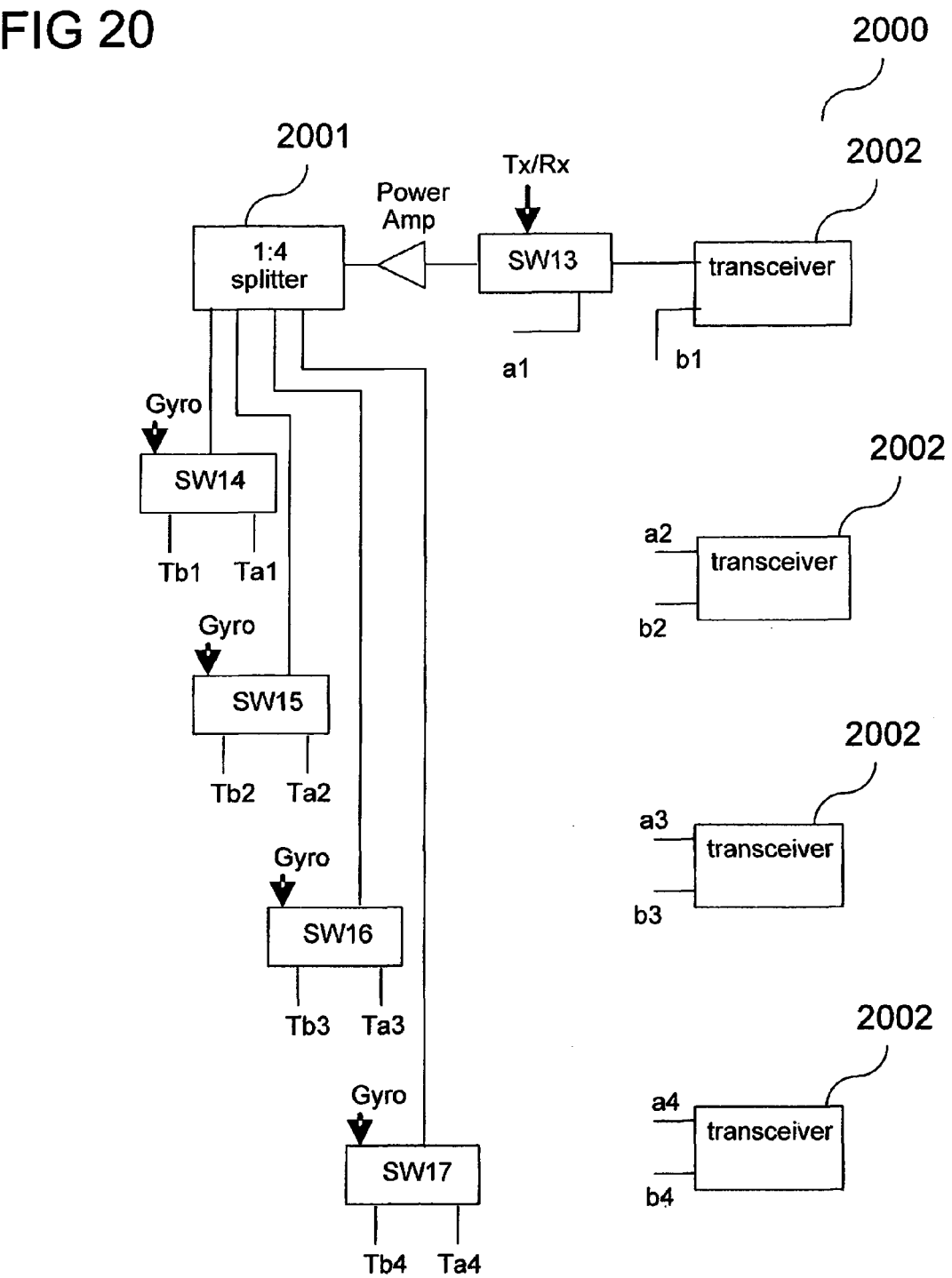
FIG. 20 shows second part of an antenna switching system used in transmit mode according to an embodiment.

FIG. 20 shows second part of an antenna switching system 2000 used in transmit mode according to an embodiment.

The second part of the antenna switching system 2000 supplies signals to be transmitted to the first part of the antenna switching system 1900 when the communication device including the first part of the antenna switching system 1900 and the second part of the antenna switching system 2000 is set to transmit mode.

On the other hand, the first part of the antenna switching system 1900 supplies signals to be transmitted to the second part of the antenna switching system 2000 including the first part of the antenna switching system 1900 and the second part of the antenna switching system 2000 is set to receive mode.

The antenna switching system 2001 is based on the antenna structure shown in FIG. 19, i.e. an antenna structure including four antenna arrangements, each covering a sector and having three antennas (not shown in FIG. 20).

Similarly to the communication device explained with reference to FIGS. 12 and 16, only a single transceiver 2002 is activated in the transmit process, and a signal to be transmitted is split by a splitter 2001 to the four different antenna arrangements.

The antenna switching arrangements 1900, 2000 include switches designated SW1 to SW17 which are set based on the mode of transmission (transmit or receive) and orientation information supplied by a gyroscope (not shown), e.g. based on position or orientation information of a ship on which the antenna structure is mounted.

In FIGS. 19 and 20, in receive mode, a1, a2, a3, a4 and b1, b2, b3, b4 are used as receive inputs of the transceivers 2002. The transmit inputs of the antenna arrangements 1901-1904 are designated by Ta1, Ta2, Ta3, Ta4 and Tb1, Tb2, Tb3, Tb4.

For example, in transmit mode, based on the orientation information supplied by the gyroscope, the switches SW14, SW15, SW16, SW17 select (independently from each other) Ta1, Ta2, Ta3, Ta4 if the signal should be transmitted using the center (middle) antenna of the respective antenna arrangement. The switches SW1, SW4, SW7, SW10 are set, based on the Tx/Rx signal, to transmit mode and supply any signal supplied to them via their transmit input (Ta1, Ta2, Ta3, Ta4) to the middle antenna (A2, B2, C2, D2) of their respective antenna arrangement.

If the respective middle antenna should not be used for transmitting, the respective switch SW14, SW15, SW16, SW17 selects Tb1, Tb2, Tb3, or Tb4, respectively for antenna input. In transmit mode, the switches SW3, SW6, SW9, SW12 are set, based on the Tx/Rx signal, to supply the transmit signal to the switches SW2, SW5, SW8, SW11 which are set to supply the transmit signal, based on the information supplied by the gyroscope to the upper antenna (A1, B1, C1, D1) or the lower antenna (A3, B3, C3, D3) as suitable in view of the gyroscope information for the respective antenna arrangement 1901, 1902, 1903, 1904.

In receive mode, the switches SW1, SW4, SW7, SW10, SW3, SW6, SW9, and SW12 are set, based on the Tx/Rx signal, to supply signals received by them via amplifiers (LNA) to the transceivers 2002 using the transceiver inputs a1, a2, a3, a4 and b1, b2, b3, b4. Similarly as in transmit mode, the switches SW2, SW5, SW8, SW11 are set to activate the upper antenna or the lower antenna of the respective antenna arrangement 1901-1904 for receiving such that in each antenna arrangement, the middle antenna and either the lower or the upper antenna are activated to have angular diversity.

In the following, an embodiment is described which may be seen to be based on a single transceiver with receive angular diversity and gyroscope inputs to control the phase adjustment in an antenna combining process.

In this embodiment, in the receive mode, the signal received by different antennas is combined and processed as if it was received by a single antenna. Thus, in this embodiment, only a single transceiver is used, even in receive mode. The placement of the antennas may be similar to the embodiments described above, i.e. the antenna structure used may for example be one of the possible antenna structures used for the communication device 1200 described with reference to FIG. 12. The type of antenna may be selected similarly as in the embodiment described with reference to FIGS. 12 and 16. The architecture is described in the following with reference to FIG. 21.

Figure 21:
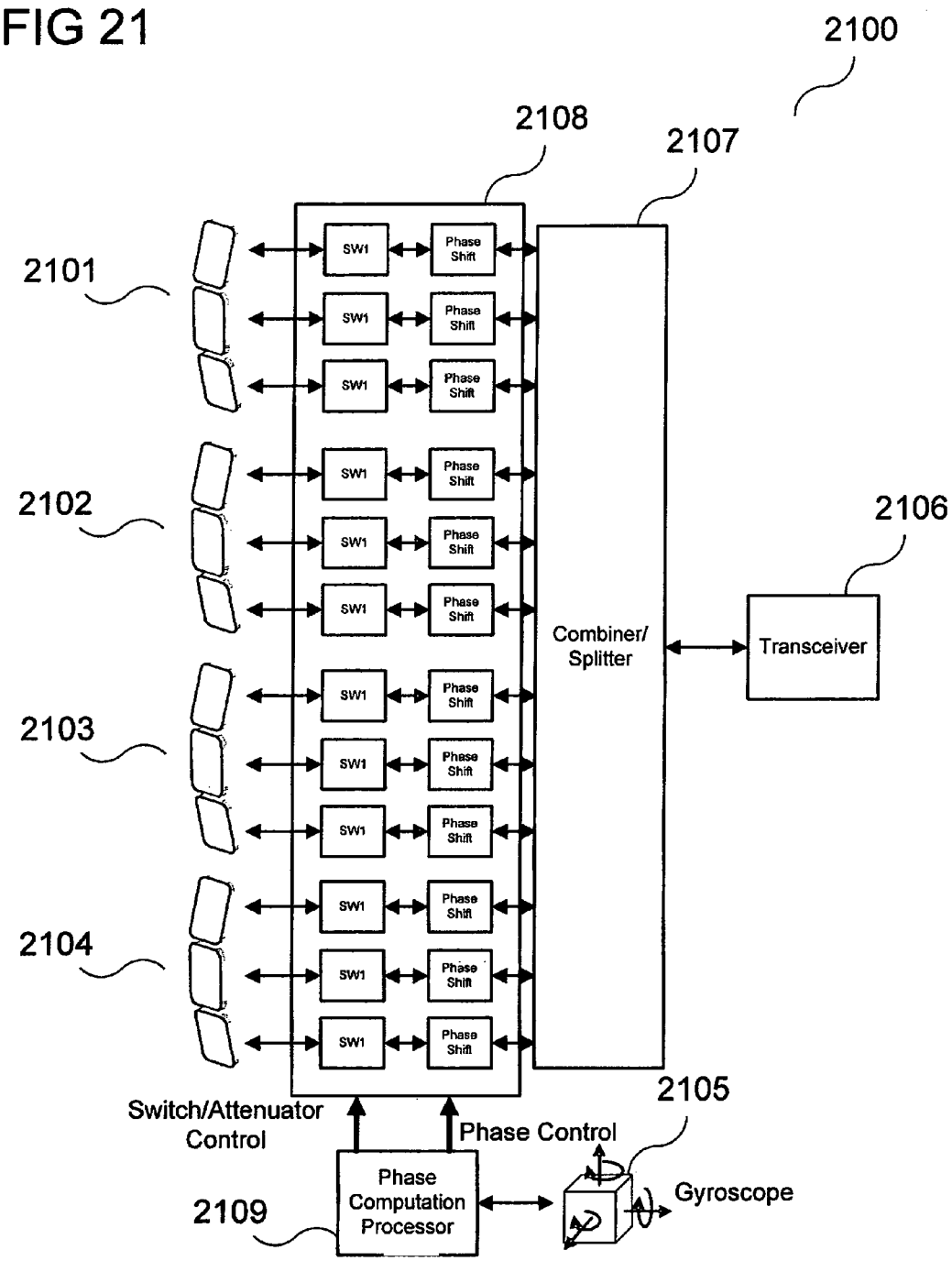
FIG. 21 shows a communication device according to an embodiment.

FIG. 21 shows a communication device 2100 according to an embodiment.

The communication device 2100 includes an antenna structure including four antenna arrangements 2101-2104, wherein each antenna arrangement 2101-2104 covers a (horizontal) sector and includes three antennas for covering different vertical angles.

Analogously to the communication device 1200, 1600 described with reference to FIGS. 12 and 16, the communication device 2100 includes a gyroscope 2105. The communication device 2100 further includes a (single) transceiver 2106, a combiner/splitter 2107 working as a combiner in receive mode and as a splitter in transmit mode, a phase computation processor 2109 and a switch and phase shift circuit 2108.

In receive mode, the signals received by the different antennas of the antenna structure are input to the switch and phase shift circuit 2108 and are adjusted (phase adjustment) based on the information supplied by the gyroscope 2106. The gyroscope 2106 provides orientation information of the antenna structure, e.g. information about the position of the ship on which the antenna structure is mounted. According to the orientation information, the phase rotation to be applied to the received signals provided by the different antennas is determined by the phase computation processor 2109. The phase rotation is applied by the switch and phase shift circuit 2108 using programmable/tunable phase shifters.

The receiving process used in this embodiment using phase adjustment may be similar to equal-gain combining in diversity reception. The computation of the phase to be applied may be solely based on the gyroscope information and certain processing to determine the actual phase selection through voltage selection or switching.

The phase computation algorithm carried out by the phase computation processor 2109 for example selects the phases in such a way that the signal input from a line-of-sight path is maximized. This typically depends on the positioning of the antennas and the ship's position.

In one embodiment, an antenna input from one antenna may be completely switched out of the signal path by the switches of the switch and phase shift circuit 2108. This may be useful when in transmit mode (while in one embodiment, this is not done in receive mode). The switches are for example controlled in accordance with the phase computation algorithm carried out by the phase computation processor 2109. Variable attenuators can also be added to the individual signal paths, either replacing the switches or in series with the switches. When the switches are replaced by variable attenuators then the phase computation processor 2109 may also determine the attenuator values for the individual paths. This is for example carried out similarly to maximal ratio combining. The input for converging may again be based on the information provided by the gyroscope 2105.

As mentioned, the configuration shown in FIG. 21 is for an antenna configuration as explained for the communication device 1200, 1600 described above with reference to FIGS. 12 and 16. The actual number of signal paths depends on the number of antennas used and the positioning of the antennas.

In one embodiment, transmit power amplifiers and receive low noise amplifiers are used (not shown in FIG. 21). Depending on the cost and the maximum transmit power, a single power amplifier and a single low noise amplifier may be used or multiple amplifiers in each of the signal path, e.g. one in each signal path (as indicated by the double arrows in FIG. 21), may be used.

The embodiment described with reference to FIGS. 12 and 16 may be seen to be directed to a solution wherein angular diversity is not adopted. The embodiments described with reference to FIGS. 19 and 20 may be seen to be directed to solutions wherein angular diversity is employed. The embodiment described with reference to FIGS. 19 and 20 and the embodiment described with reference to FIG. 21 may be seen to differ in the number of transceivers used. The embodiment described with reference to FIGS. 19 and 20 makes use of multiple transceivers while the embodiment described with reference to FIG. 21 uses only one transceiver.

The invention claimed is:

1. A communication device comprising
an antenna arrangement,
an orientation determining device configured to determine the orientation of the antenna arrangement,
a controller configured to control the directivity of the antenna arrangement based on the determined orientation of the antenna arrangement;
wherein the antenna arrangement comprises a plurality of antennas and the controller is configured to activate at least one of the plurality of antennas based on the determined orientation of the antenna arrangement.

2. The communication device according to claim 1, wherein the orientation of antenna arrangement is determined based on the orientation of the communication device.

3. The communication device according to claim 1, wherein the directivity of the antenna arrangement is controlled such that a transmitted signal is received along two paths and the transmitted signal is received as a first received signal and as a second received signal.

4. The communication device according to claim 3, wherein the antenna arrangement comprises a plurality of antennas and the controller is configured to activate at least two of the plurality of antennas based on the determined orientation of the antenna arrangement such that the transmitted signal is received as the first received signal by an activated first antenna of the plurality of antennas and the transmitted signal is received as the second received signal by an activated second antenna of the plurality of antennas.

5. The communication device according to claim 3, further comprising a combining circuit configured to generate a received signal for further processing based on the first received signal and the second received signal.

6. The communication device according to claim 5, wherein the combining circuit is configured to select the received signal for further processing based on the first received signal and the second received signal.

7. The communication device according to claim 5, wherein the combining circuit is configured to generate the received signal for further processing by combining the first received signal and the second received signal.

8. The communication device according to claim 7, wherein the combining comprises a phase shifting of at least one of the first received signal and the second received signal.

9. The communication device according to claim 8, wherein the phase shifting is carried out based on the determined orientation of the antenna arrangement.

10. The communication device according to claim 1, wherein the communication device comprises an antenna structure comprising the antenna arrangement and at least one further antenna arrangement.

11. The communication device according to claim 10, comprising a further controller configured to control the directivity of the at least one further antenna arrangement based on the determined orientation of the antenna arrangement.

12. The communication device according to claim 10, wherein the antenna arrangement and the at least one further antenna arrangement are arranged in the antenna structure to cover different sectors.

13. The communication device according to claim 12, wherein the antenna arrangement and the at least one further antenna arrangement are arranged in the antenna structure to cover different sectors of a first plane in space and the controller is configured to control the directivity of the antenna arrangement in a second plane in space.

14. The communication device according to claim 13, wherein the antenna arrangement comprises a plurality of antennas arranged to cover different sectors in the second plane and the controller is configured to activate at least one of the plurality of antennas based on the determined orientation of the antenna arrangement.

15. The communication device according to claim 13, wherein the at least one further antenna arrangement comprises at least one further plurality of antennas arranged to cover different sectors in the second plane and the controller is configured to activate at least one of the at least one further plurality of antennas based on the determined orientation of the antenna arrangement.

16. The communication device according to claim 13, wherein the first plane and the second plane are perpendicular.

17. The communication device according to claim 16, wherein the first plane is the horizontal plane and the second plane is the vertical plane.

18. The communication device according to claim 10, wherein the communication device comprises a receiver and at least one further receiver and the receiver is configured to receive signals via the antenna arrangement and the at least one further receiver is configured to receive signals via the at least one further antenna arrangement.

19. The communication device according to claim 10, wherein the communication device comprises a transmitter configured to transmit a signal via the antenna arrangement and the at least one further antenna arrangement.

20. The communication device according to claim 1, wherein the antenna arrangement is mounted on a boat or ship and the orientation determining device is configured to determine the orientation of the antenna arrangement based on a determined orientation of the boat or ship.

21. The communication device according to claim 1, wherein the orientation determining device comprises a gyroscope.

22. Method for controlling an antenna arrangement of a communication device, the antenna arrangement comprising a plurality of antennas, the method comprising:
  determining the orientation of the antenna arrangement;
  controlling the directivity of the antenna arrangement based on the determined orientation of the antenna arrangement; and
  activating at least one of the plurality of antennas based on the determined orientation of the antenna arrangement.

* * * * *